(12) United States Patent
Guemmer

(10) Patent No.: US 8,202,039 B2
(45) Date of Patent: Jun. 19, 2012

(54) BLADE SHROUD WITH APERTURE

(75) Inventor: Volker Guemmer, Mahlow (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 547 days.

(21) Appl. No.: 12/489,598

(22) Filed: Jun. 23, 2009

(65) Prior Publication Data

US 2009/0317232 A1   Dec. 24, 2009

(30) Foreign Application Priority Data

Jun. 23, 2008 (DE) .......................... 10 2008 029 605

(51) Int. Cl.
*F01D 25/24* (2006.01)

(52) U.S. Cl. ... 415/55.5; 415/58.7; 415/148; 415/173.6; 415/186; 415/914; 416/90 R; 416/91; 416/181; 416/189

(58) Field of Classification Search ................. 415/55.5, 415/58.1, 58.7, 148, 173.6, 186, 914; 416/90 R, 416/91, 181, 189
See application file for complete search history.

(56) References Cited

U.S. PATENT DOCUMENTS

| | | | | |
|---|---|---|---|---|
| 2,291,828 A * | 8/1942 | New | .............................. | 415/115 |
| 3,993,414 A * | 11/1976 | Meauze et al. | ................. | 415/181 |
| 4,534,701 A * | 8/1985 | Wisser | ......................... | 415/168.4 |
| 5,230,605 A * | 7/1993 | Yamaguchi et al. | ........... | 415/151 |
| 5,232,338 A * | 8/1993 | Vincent de Paul et al. | ... | 415/144 |
| 5,632,598 A * | 5/1997 | Maier | .......................... | 415/173.5 |
| 6,632,069 B1 * | 10/2003 | Naljotov et al. | ............ | 415/173.5 |
| 7,077,623 B2 * | 7/2006 | Guemmer | ..................... | 415/58.5 |
| 8,043,046 B2 * | 10/2011 | Guemmer | ..................... | 415/115 |
| 2005/0019152 A1 * | 1/2005 | Seitz | .............................. | 415/58.5 |
| 2009/0047120 A1 * | 2/2009 | Guemmer | ..................... | 415/110 |

* cited by examiner

*Primary Examiner* — Igor Kershteyn
(74) *Attorney, Agent, or Firm* — Timothy J. Klima; Shuttleworth & Ingersoll, PLC

(57) ABSTRACT

A fluid flow machine includes a main flow path in which at least one row of blades (3, 4) is arranged, and a blade shroud (2) which forms a confinement of the main flow path in the area of a blade row (3, 4) and is arranged in a recessed cavity (10) of a surrounding physical structure (11). The cavity (10) so formed between the shroud (2) and the surrounding physical structure (11) is provided with an annular connection (14) to the main flow path at least on the outflow side of the blade shroud (2), and with the blade shroud (2) being penetrated by at least one secondary flow path (16) which, commencing at a location of high pressure on the shroud (2), issues at a surface wetted by the main flow.

16 Claims, 24 Drawing Sheets

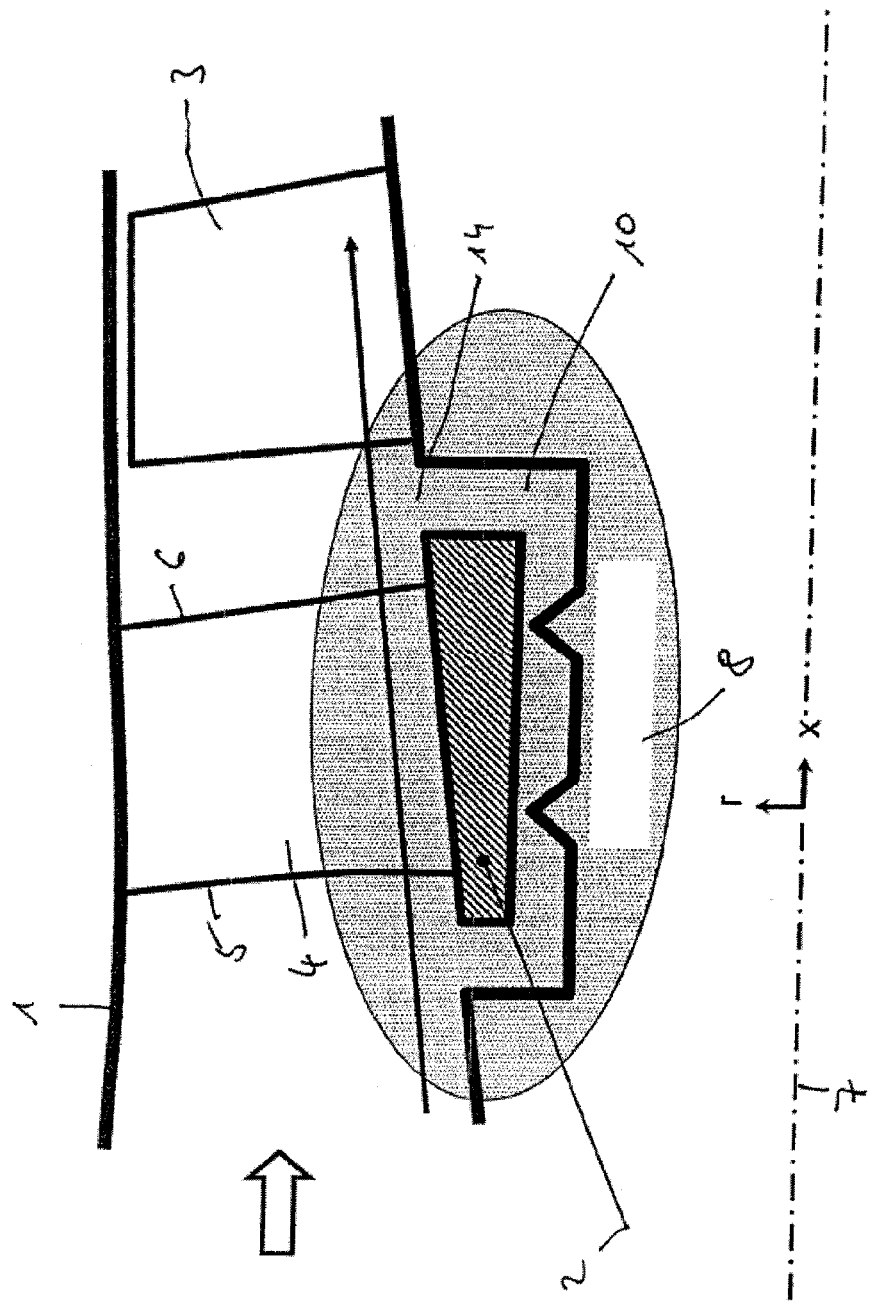
Fig.1b: State of the art

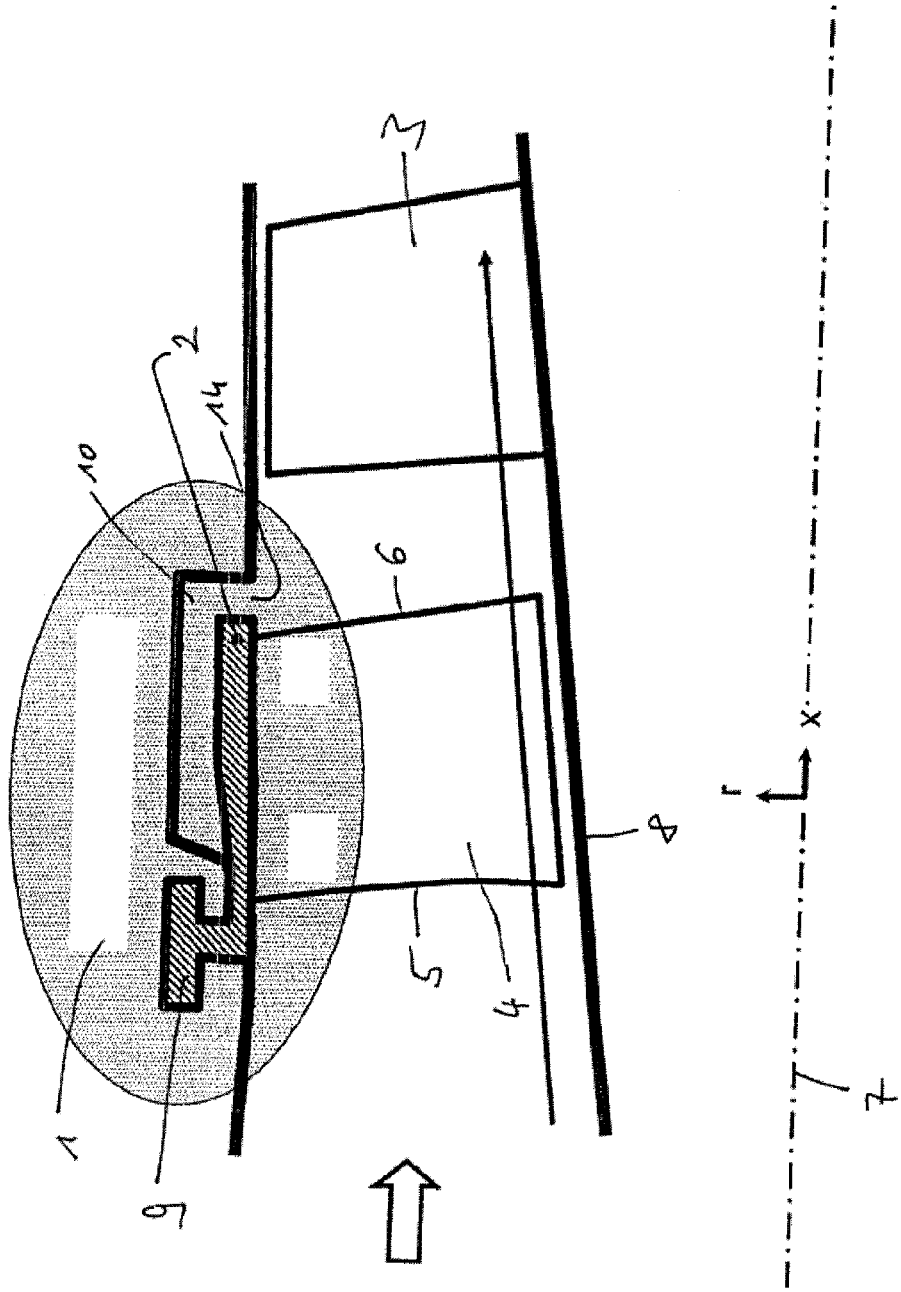

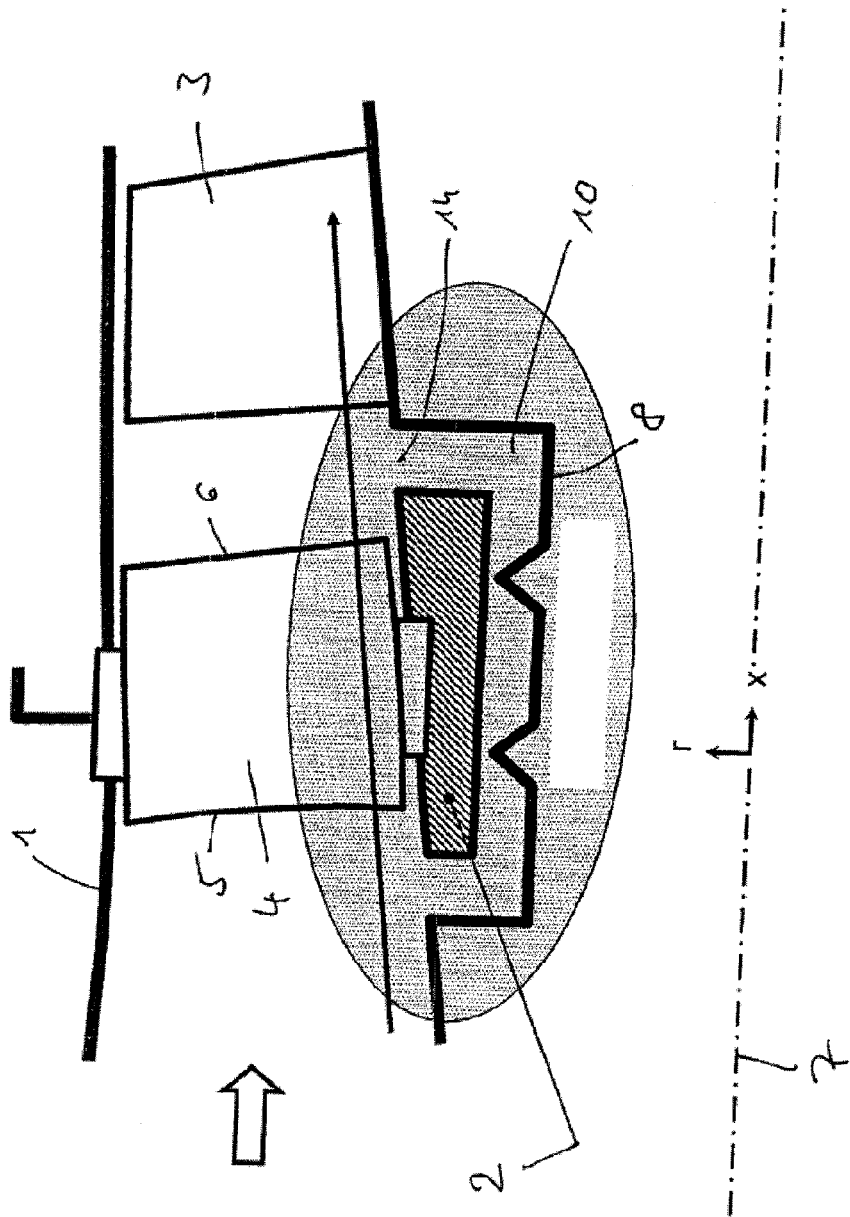

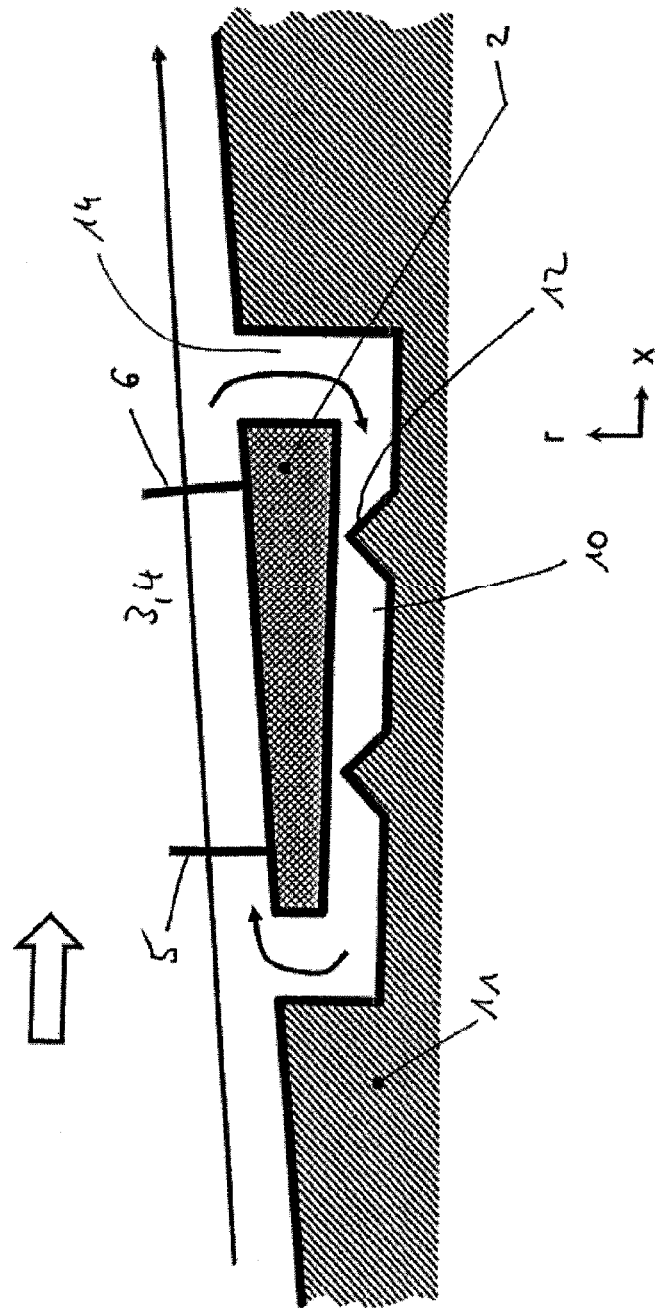
Fig.1e: State of the art

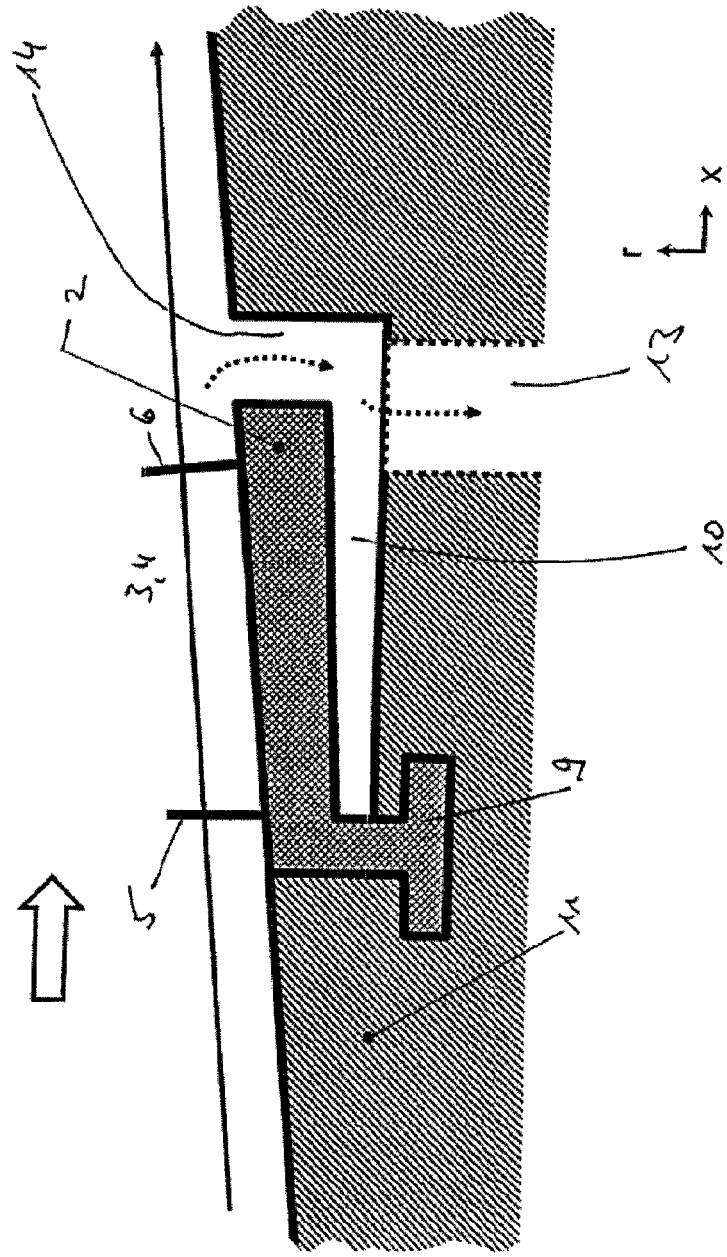
Fig.1f: State of the art

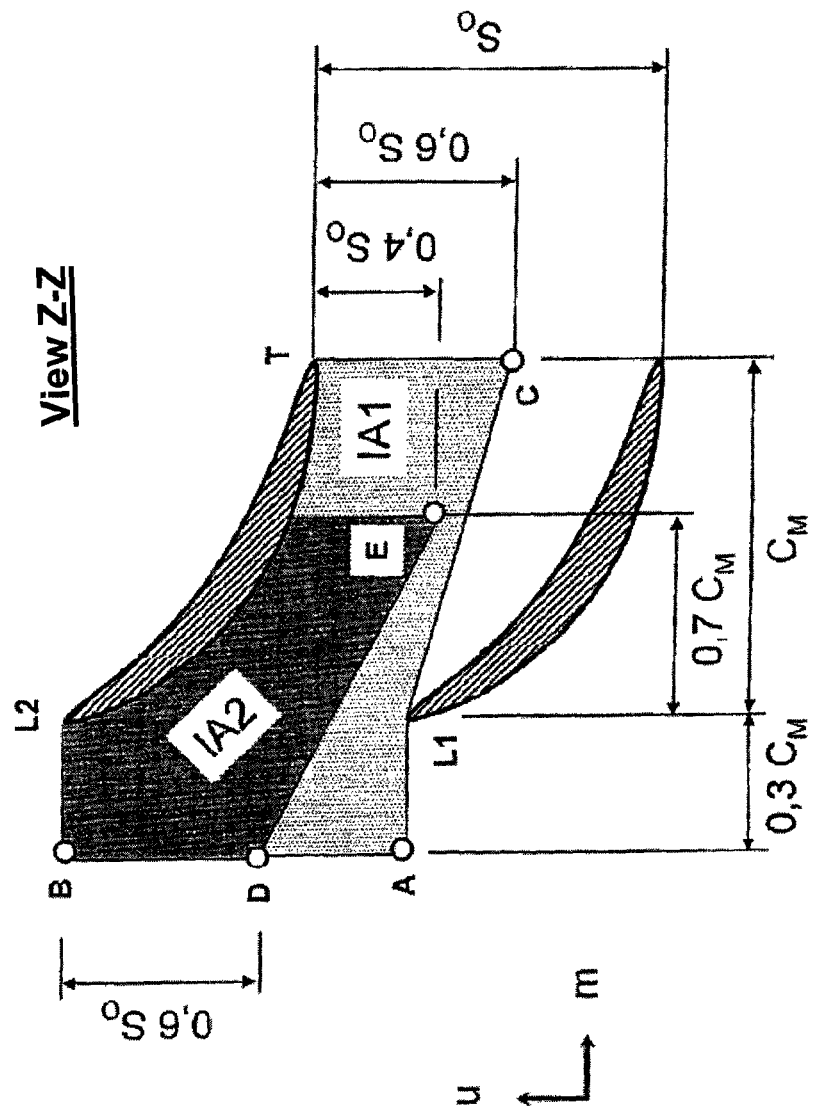

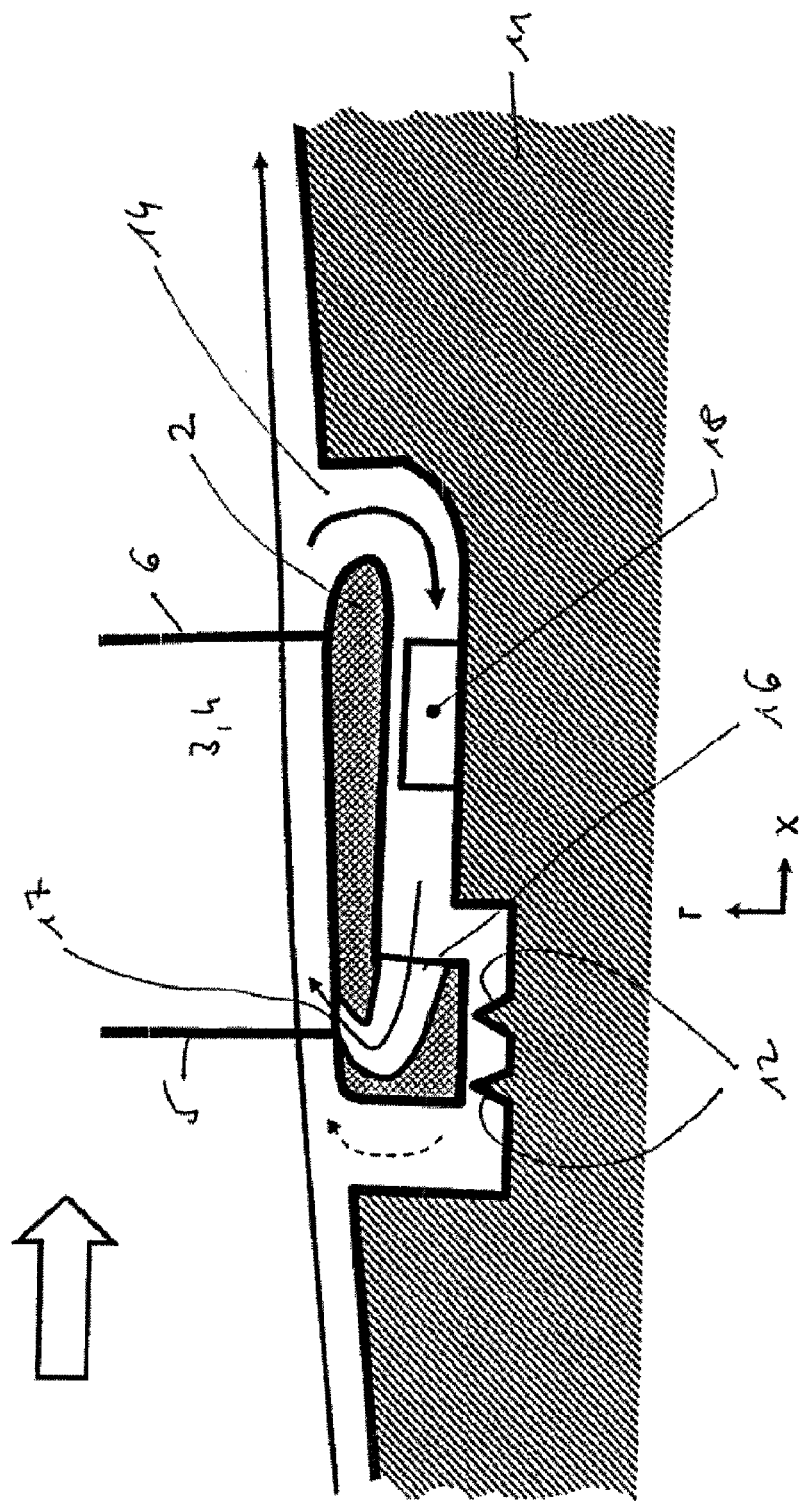

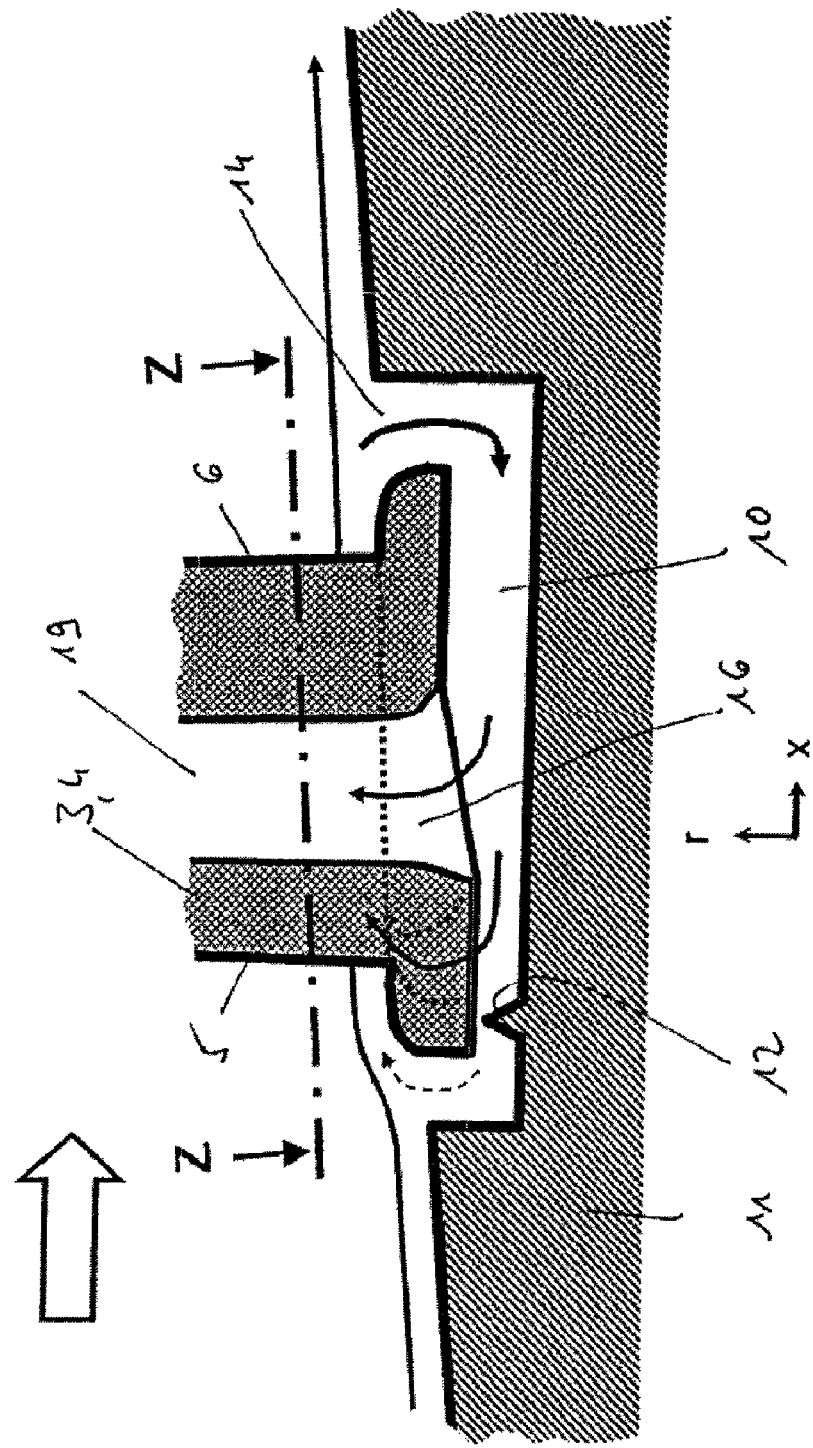

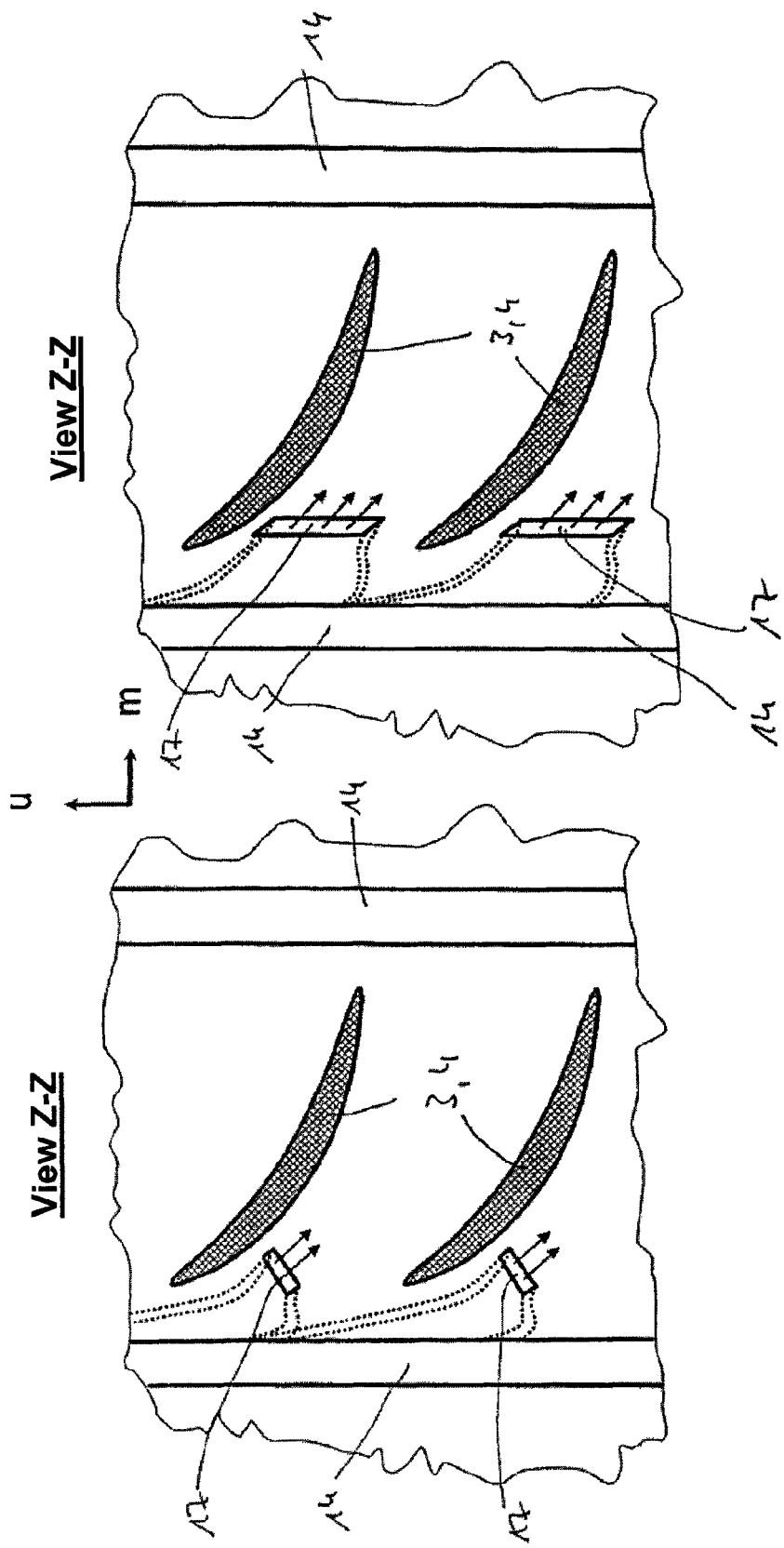

BLADE SHROUD WITH APERTURE

This application claims priority to German Patent Application DE102008029605.8 filed Jun. 23, 2008, the entirety of which is incorporated by reference herein.

This invention relates to a fluid flow machine.

The aerodynamic loadability and the efficiency of fluid flow machines, for example blowers, compressors, pumps and fans, is limited by the growth and the separation of boundary layers on the blades as well as on the hub and casing walls. To remedy this fundamental problem, the state of the art provides solutions only to a limited extent. One source of the losses occurring in fluid flow machines is the leakage flow around the blade shrouds as they are frequently provided on the inner vane end of stators or also on the outer blade end of rotors. The leakage flow is usually minimized by sealing fins which are arranged within the shroud cavity. Nevertheless, the leakage flow may lead to severe flow separation and thus severely affect the performance of fluid flow machines (FFM), in particular in aerodynamically very highly loaded blade rows which are characterized by a high static pressure increase and, thus, a strong propulsion for the leakage flow.

Figure 1A:
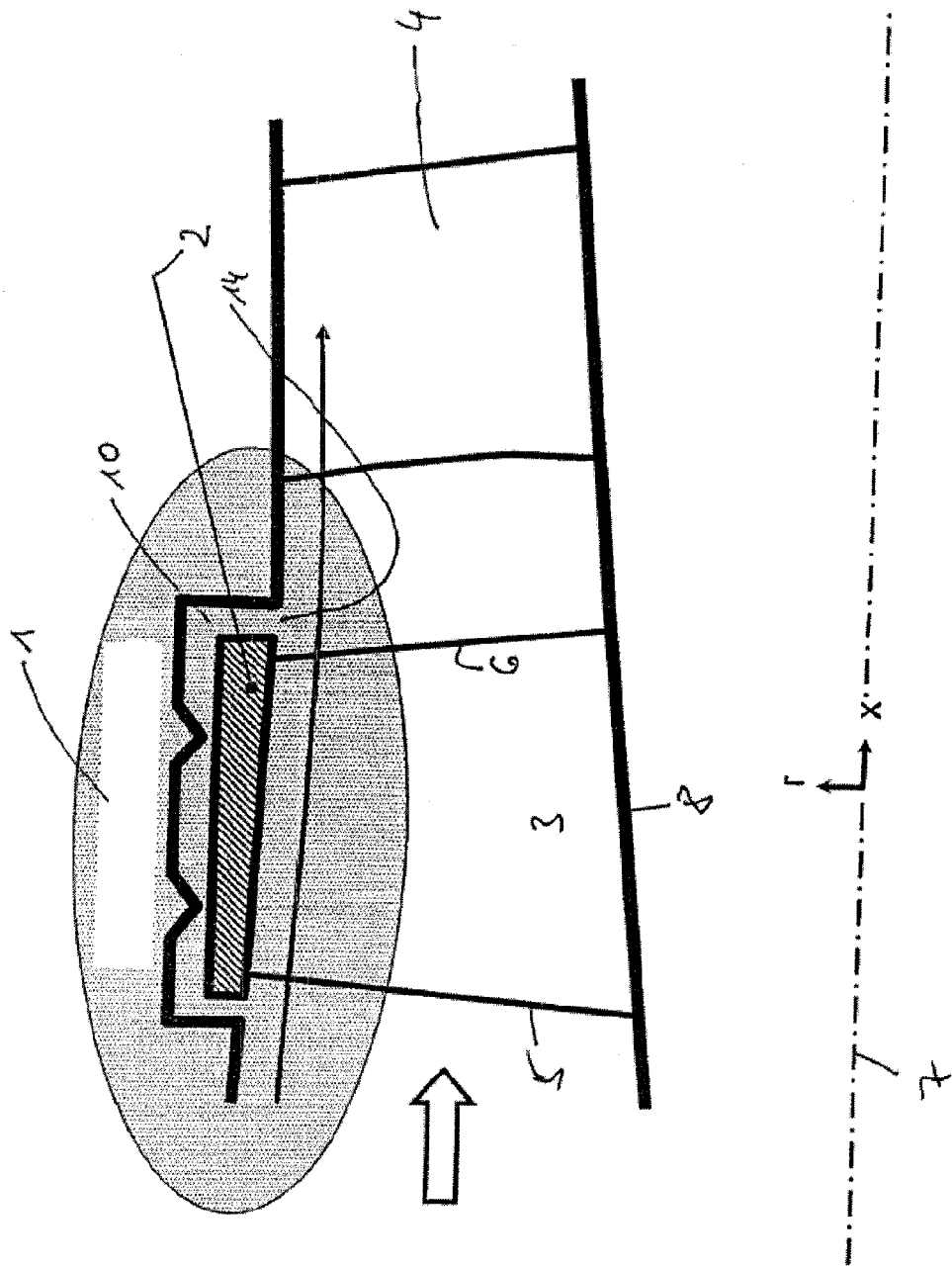
Figure 2A:
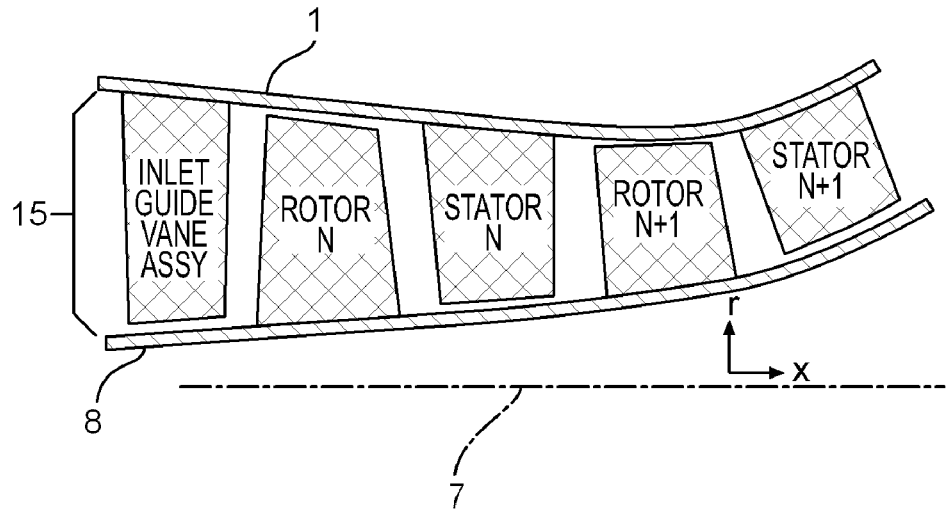
Figure 2B:
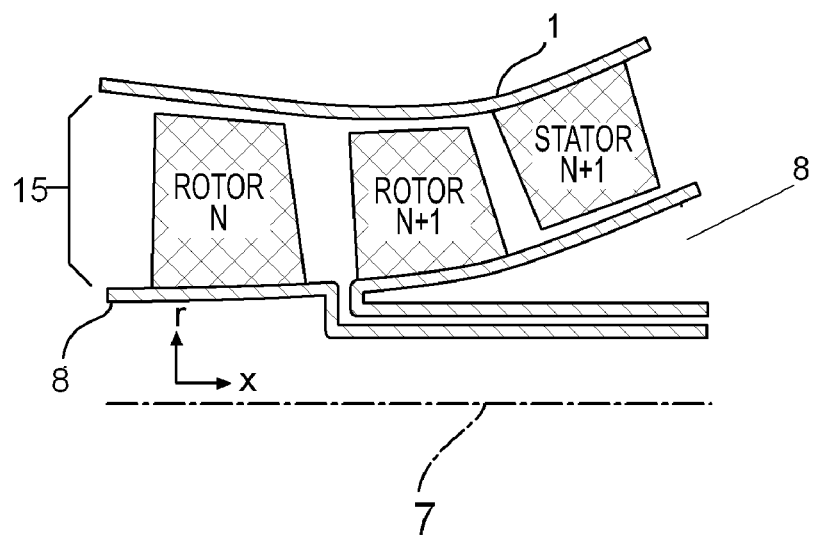
Figure 2C:
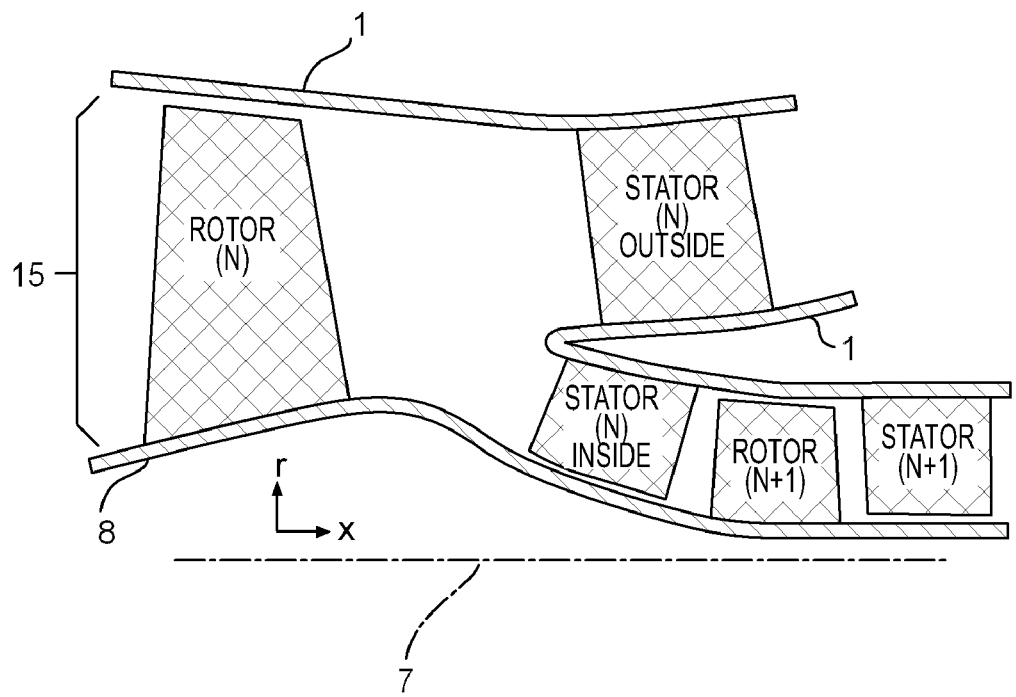
Figure 2D:
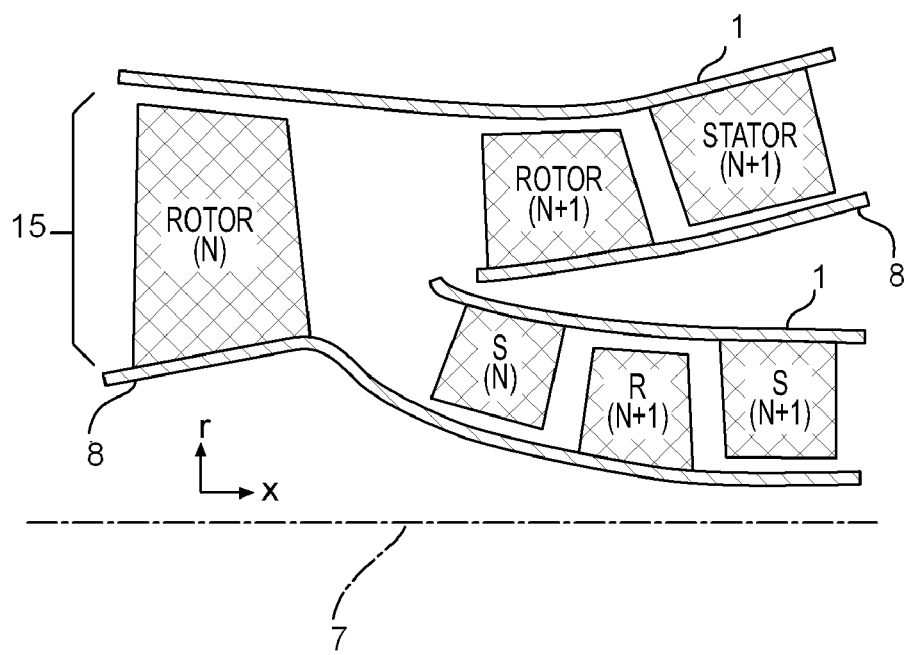

FIG. 1a schematically shows a section of a fluid flow machine including a rotor blade row 3 and a stator vane row 4. Particular prominence is given to the shroud arrangement on the outer blade end of the rotor 3. In accordance with the state of the art, this shroud arrangement features a large cavity 10 which is provided in the casing 1 and into which the shroud 2 is embedded to make the outer confinement of the main flow path as smooth as possible.

FIG. 1b also shows a section of a fluid flow machine, here including a fixed stator vane row 4 and a rotor blade row 3. Particular prominence is given to the shroud arrangement on the inner vane end of the fixed stator 4. In accordance with the state of the art, this shroud arrangement features of a large cavity 10 which is provided in the hub 8 and into which the shroud 2 is completely embedded to make the inner confinement of the main flow path as smooth as possible.

FIG. 1c again schematically shows a section of a fluid flow machine, here including a rotor blade row 3 and a fixed stator vane row 4 with radial running gap at the hub 8. Particular prominence is given to the shroud arrangement on the outer vane end of the stator 4. According to the state of the art, such a shroud arrangement includes a stator vane root 9 fixed in the casing 1 in the vicinity of the blade leading edge 5 and, provided in the casing 1 and connecting to the main flow path downstream of the blade trailing edge 6, a large cavity 10 surrounding the downstream part of the blade root 9. For maximum smoothness of the outer confinement of the main flow path, the shroud 2 is fully received in the casing 1.

FIG. 1d schematically shows a section of a fluid flow machine including a row of adjustable (variable) stators 4 and a rotor blade row 3. Particular prominence is given to the shroud arrangement on the inner vane end of the variable stator 4. In accordance with the state of the art, the shroud arrangement, also in this case, features a large cavity 10 which is provided in the hub 8 and into which the shroud 2 is completely embedded to make the inner confinement of the main flow path as smooth as possible.

FIG. 1e shows, typical of the shrouds 2 of variable or fixed rotors 3 and stators 4, an arrangement of components at the boundary of the main flow path of a fluid flow machine including a blade row with shroud 2 and a further physical structure 11 surrounding said blade shroud 2 and performing a movement relative to the shroud 2 in the circumferential direction of the fluid flow machine. Between the shroud 2 and the physical structure 11 surrounding the shroud 2, a cavity 10 is therefore disposed in which sealing mechanisms 12, which are usually arranged on the side of the shroud 2 facing away from the main flow path, are provided to minimize leakage flow. The bold arrow shows the main flow passing from the left to the right-hand side through the blade rows 3, 4, the long thin arrow indicates the course of the flow at the boundary of the main flow path. The arrangement here shown can be a region on the casing 1 and a region on the hub 8 of a fluid flow machine. The shroud 2 can be solid or also hollow (as not illustrated here) and includes one or several components. The leakage flow (small arrows) occurring opposite to the main flow direction (bold arrow) between the shroud 2 and the surrounding physical structure 11 is reduced in the arrangement here shown by a number of sealing fins 12. The sealing fins 12 can be arranged on the surrounding component or also on the shroud itself (as not illustrated here). Likewise, a labyrinth arrangement can be used as a sealing mechanism 12. In the area of the shroud 2, the leading edge (VK) 5 and the trailing edge (HK) 6 of the blade row 3, 4 considered are indicated. In accordance with the state of the art here shown, the cavity 10 surrounding the blade shroud connects to the main flow path at exactly two locations, namely by an annular gap directly upstream of the shroud 2 and directly downstream of the shroud 2.

FIG. 1f shows, typical of the shrouds of variable or fixed rotors 3 and stators 4, an arrangement of components at the boundary of the main flow path of a fluid flow machine including a blade row 3, 4 with shroud 2 and a physical structure 11 surrounding said blade shroud 2 and to which the blade shroud 2 is locally connected. This arrangement is especially selected if fluid is to be discharged downstream of the respective blade row 3, 4 from the main flow path via a chamber 13 (e.g. compressor air bleed). The blade shroud 2 also forms the blade root 9. Thus, a cavity 10 is provided which only partly surrounds the shroud 2. The bold arrow indicates the main flow passing from the left to the right-hand side through the blade row 3, 4, the long, thin arrow indicates the course of the flow at the boundary of the main flow path. The arrangement here shown can be a region on the casing 1 and a region on the hub 8 of the fluid flow machine. The shroud 2 can be solid or also hollow (as not illustrated here) and includes one or several components. If fluid is discharged from the main flow path (small arrows), flow will occur through the cavity 10. The leading edge (VK) 5 and the trailing edge (HK) 6 of the blade row considered are indicated in the area of the shroud 2. In accordance with the state of the art, the cavity 10 surrounding the shroud 2 is connected to the main flow path only directly on the downstream side of the blade shroud 2 via an annular gap 14.

Disadvantageously, high total pressure losses attributable to boundary-layer thickening occur on the surfaces of aerodynamically highly loaded shrouded blade rows on both blade profile and flow path boundary (outer/inner annulus walls). This is particularly relevant in connection with the occurrence of a leakage flow introducing low-energetic fluid upstream of the blade row. This will result in bad operating characteristics in terms of efficiency, stability and width of the operating range of the fluid flow machine.

In a broad aspect, the present invention provides a fluid flow machine of the type specified above, which while being simply designed and easily and cost-effectively producible features high efficiency and is characterized by optimized flow conditions.

The present invention relates to blade rows of fluid flow machines, such as blowers, compressors, pumps and fans of the axial, semi-axial or radial type using gaseous or liquid working media. The fluid flow machine may include one or several stages, each featuring a rotor and a stator, in individual cases, the stage only includes a rotor. The rotor features a number of blades, which are connected to the rotating shaft of the machine and impart energy to the working medium. The rotor may be designed with or without a shroud at the outer blade end. The stator includes a number of stationary vanes, which may either feature a fixed or a free vane end on the hub and on the casing side. The rotor drum and blading are usually enclosed by a casing. The machine may also feature a stator, a so-called inlet guide vane assembly, upstream of the first rotor. Departing from the stationary fixation, at least one stator or inlet guide vane assembly may be rotatably borne, to change the angle of attack. Variation is accomplished for example via a spindle accessible from the outside of the annulus duct. In an alternative configuration, multi-stage types of said fluid flow machines may have two counter-rotating shafts, with the direction of rotation of the rotor blade rows alternating between stages. Here, no stators exist between subsequent rotors. Finally, the fluid flow machine may—alternatively—feature a bypass configuration such that the single-flow annulus divides into two concentric annuli behind a certain blade row, with each of these annuli housing at least one further blade row. FIG. 2 shows examples of four possible configurations of fluid flow machines.

More particularly, the present invention covers the design of a shroud of the blade row of a fluid flow machine such that a secondary flow path is provided in the blade shroud in at least one circumferential location which fully penetrates the shroud, thereby providing an additional connection to the main flow path such that fluid flows from a zone in the area of the shroud cavity through the shroud to a location on the blade-side and/or the main flow-side shroud surface.

In accordance with the present invention, a blade shroud arrangement is provided for application in a fluid flow machine, which by a special aperture, additionally influences the course of the flow in the main flow path, thereby enhancing the efficiency of the respective blade row.

Figure 3A:
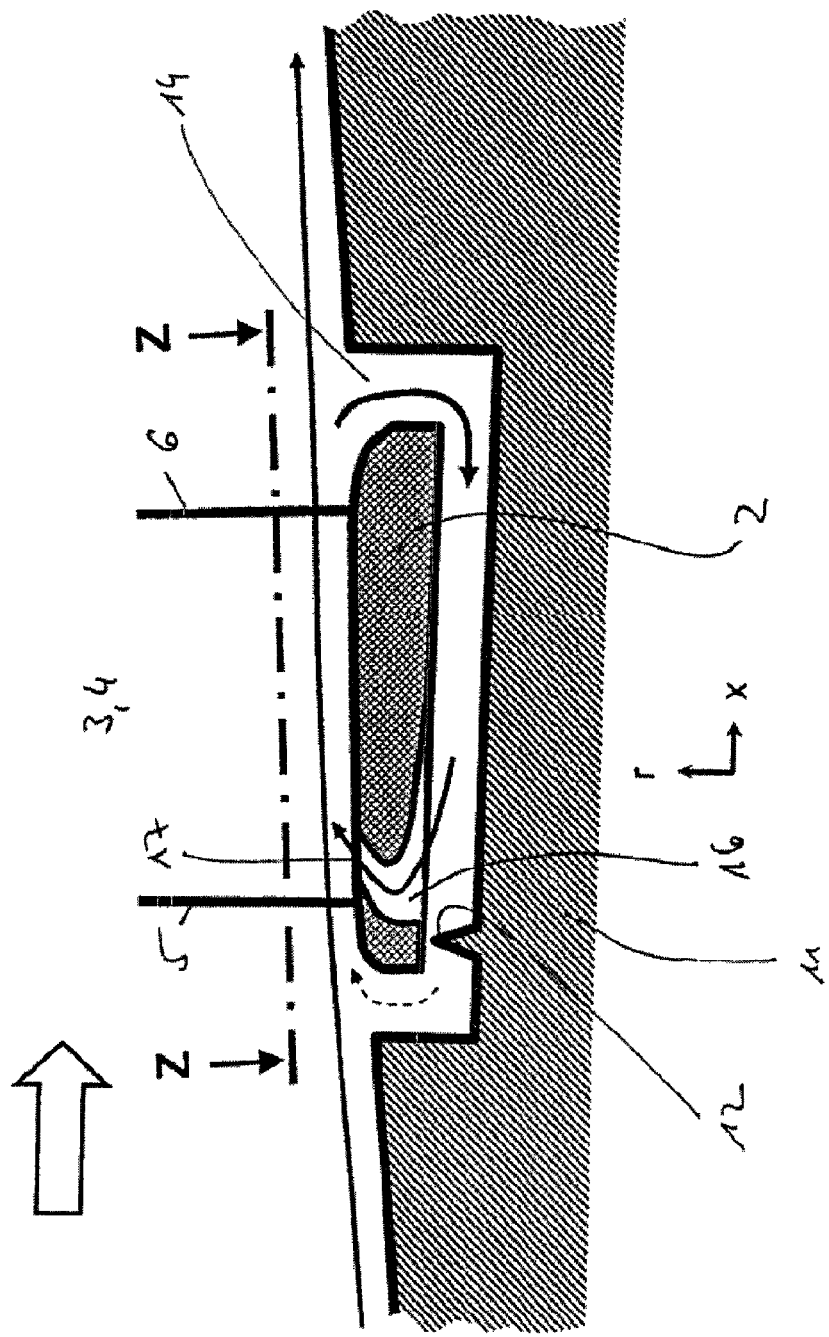
Figure 3B:
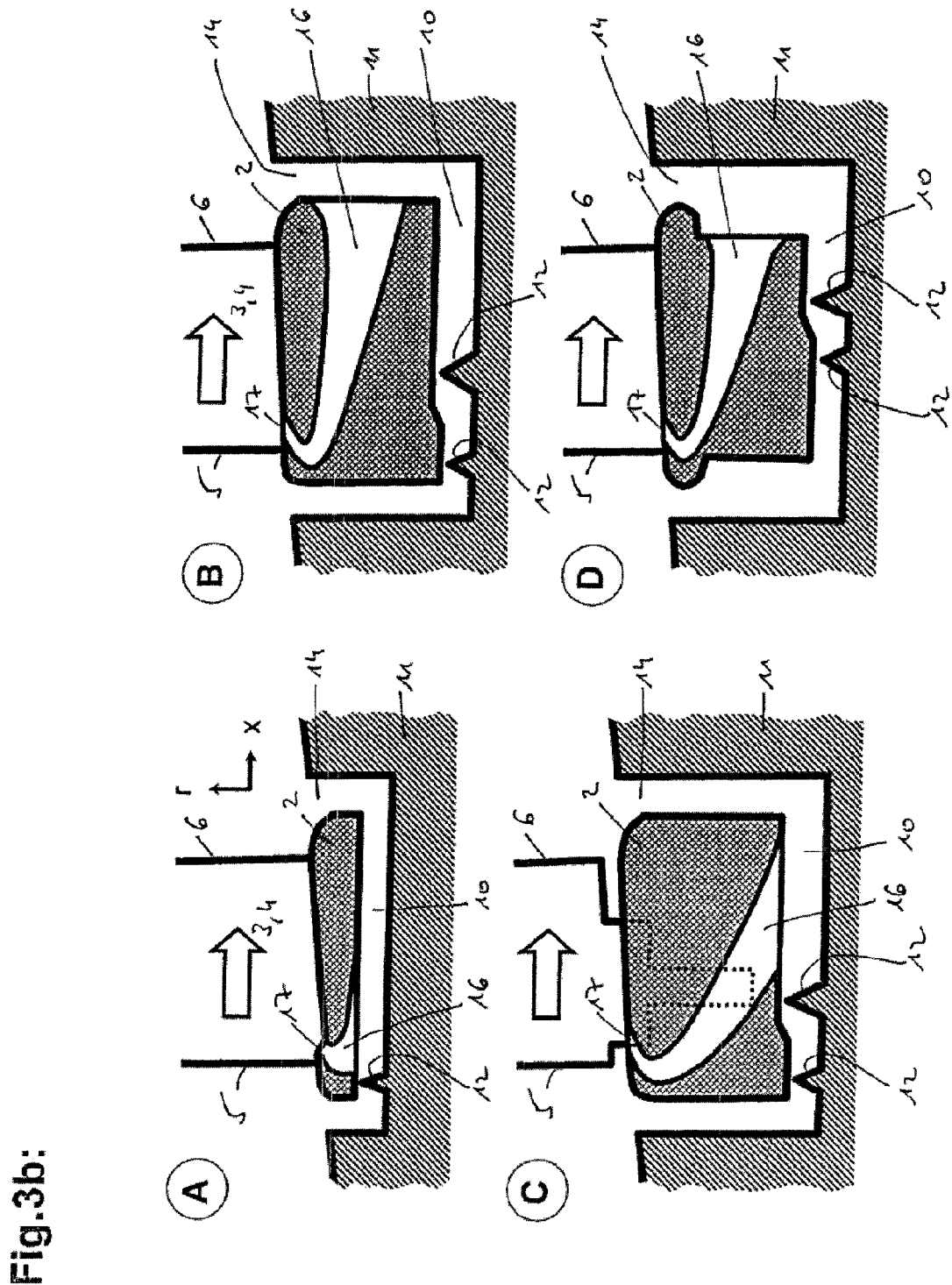
Figure 3D:
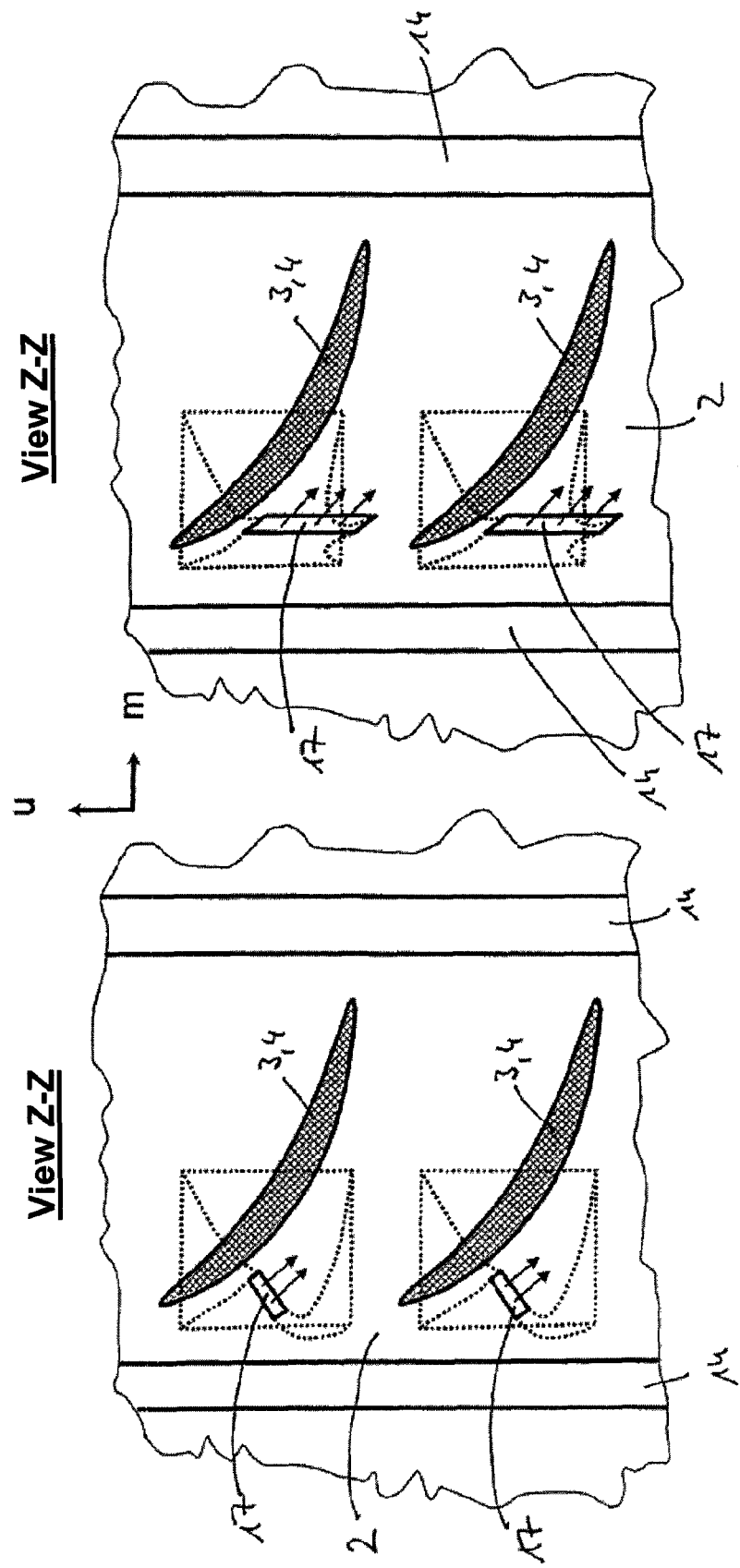
Figure 3E:
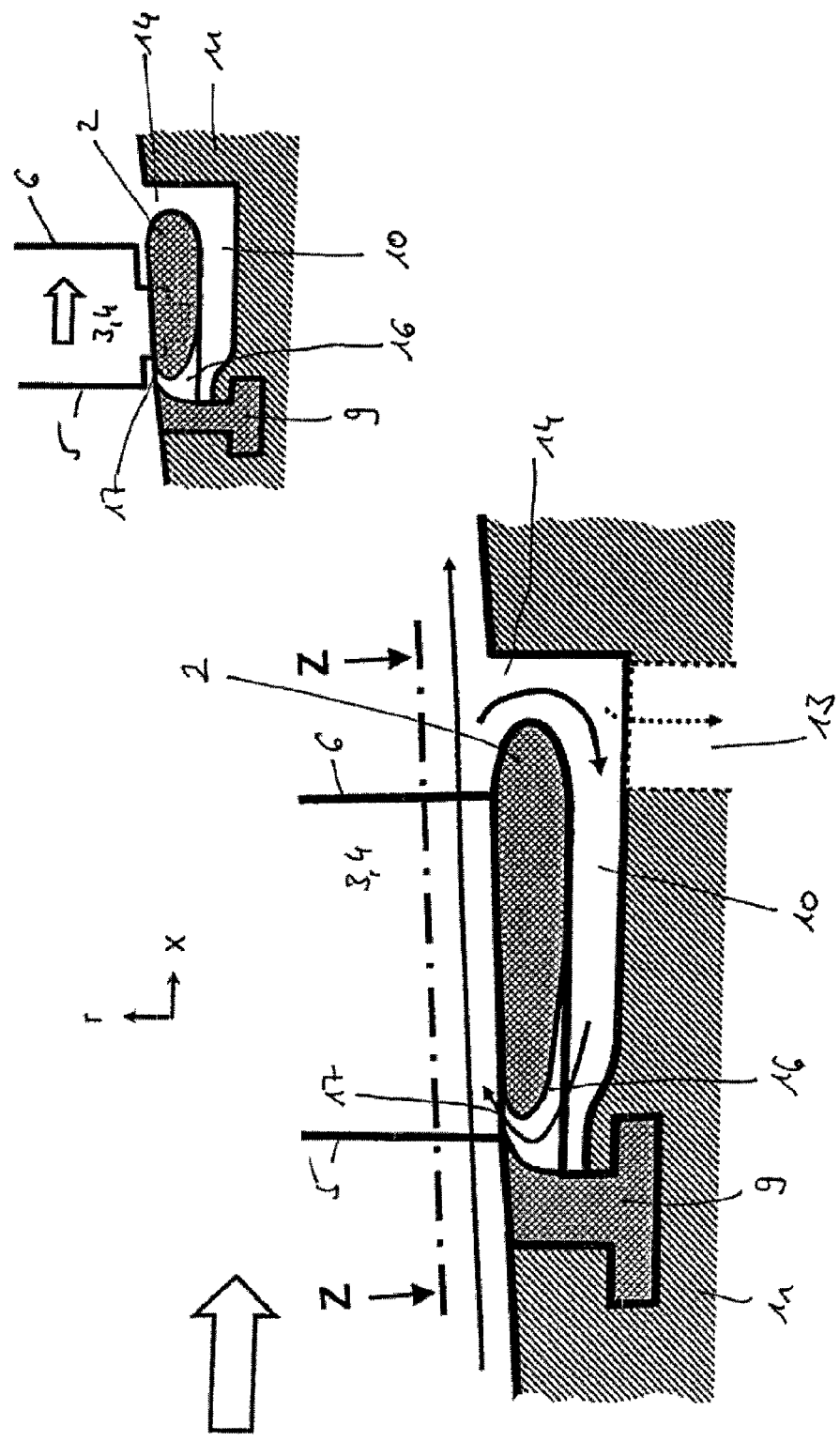
Figure 3F:
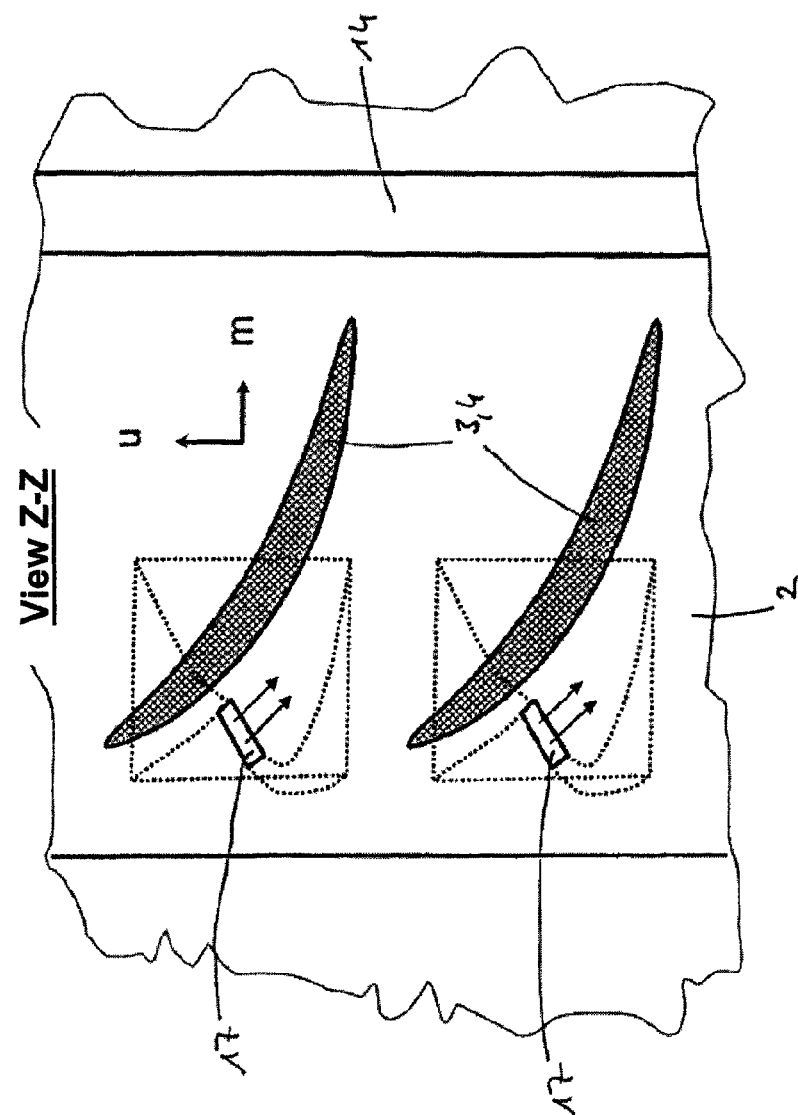
Figure 4A:
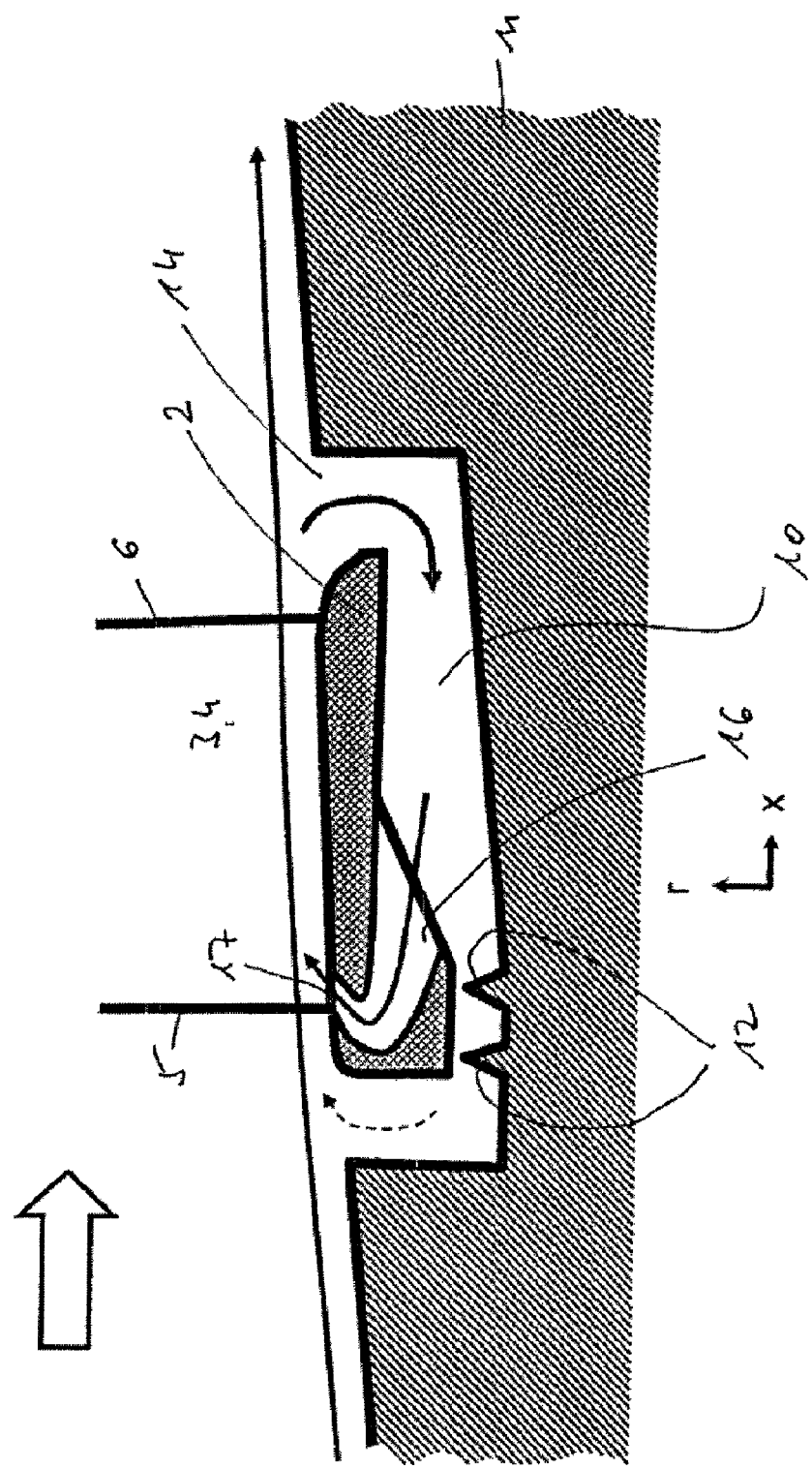
Figure 4C:
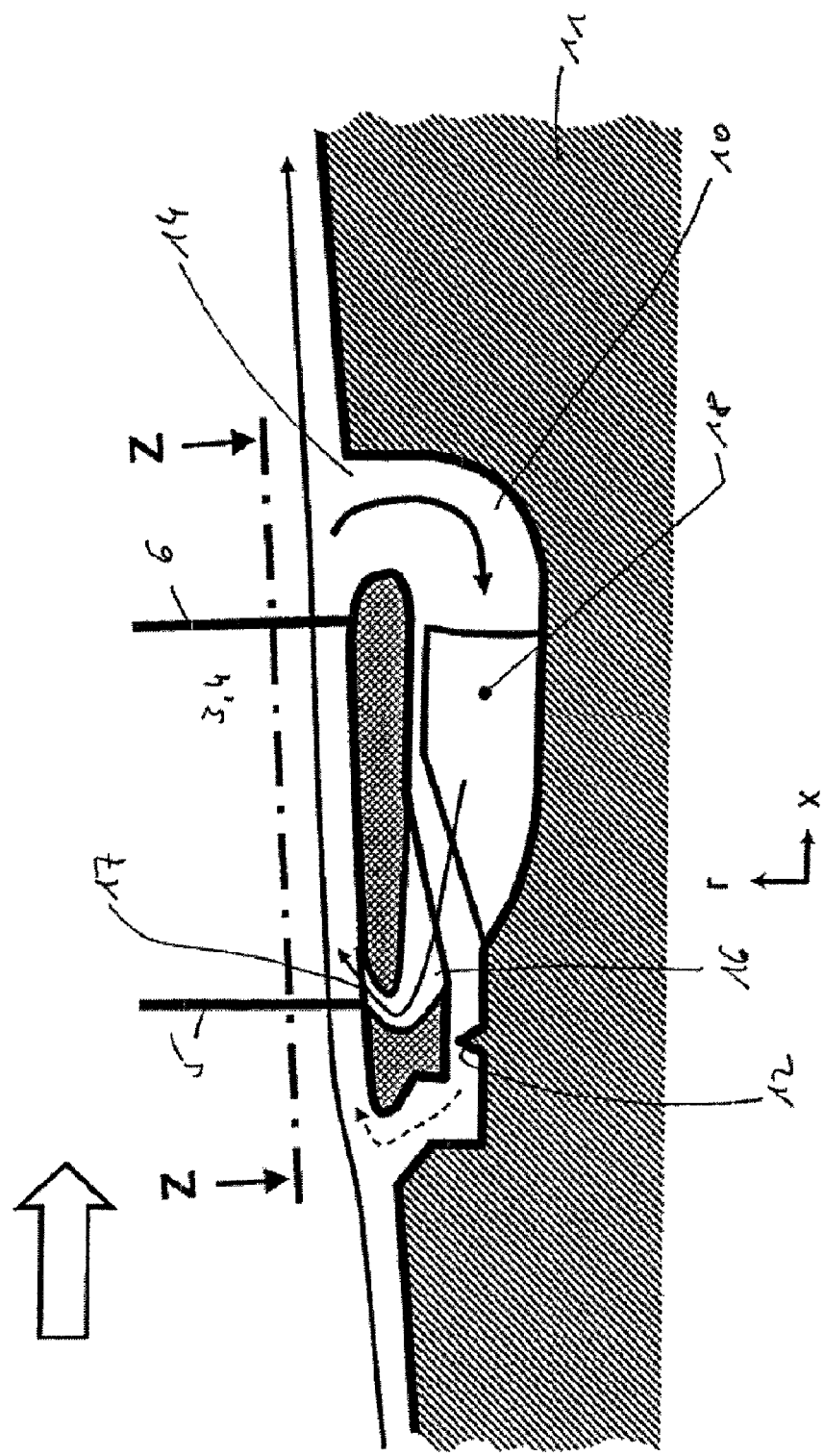
Figure 4D:
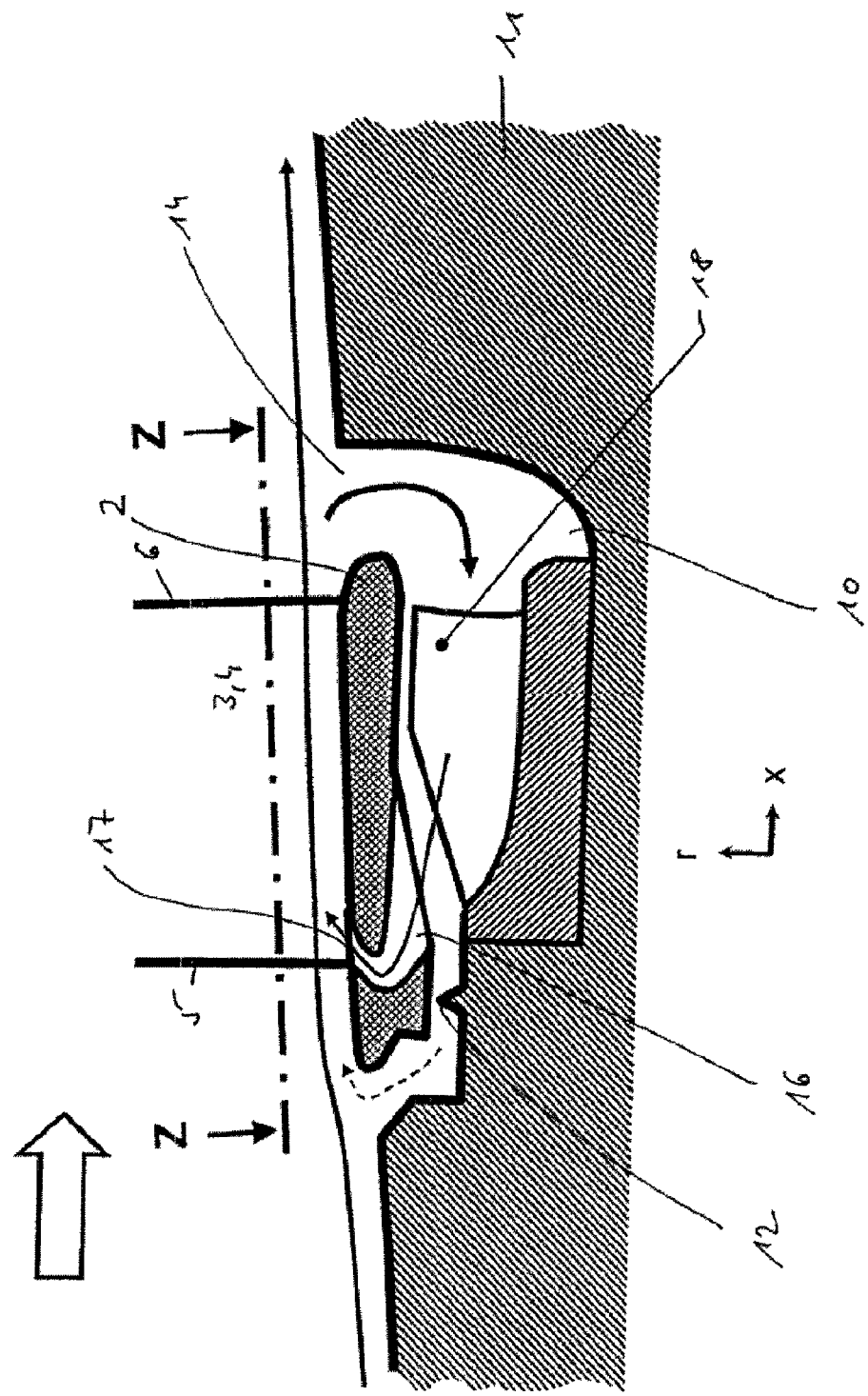
Figure 4E:
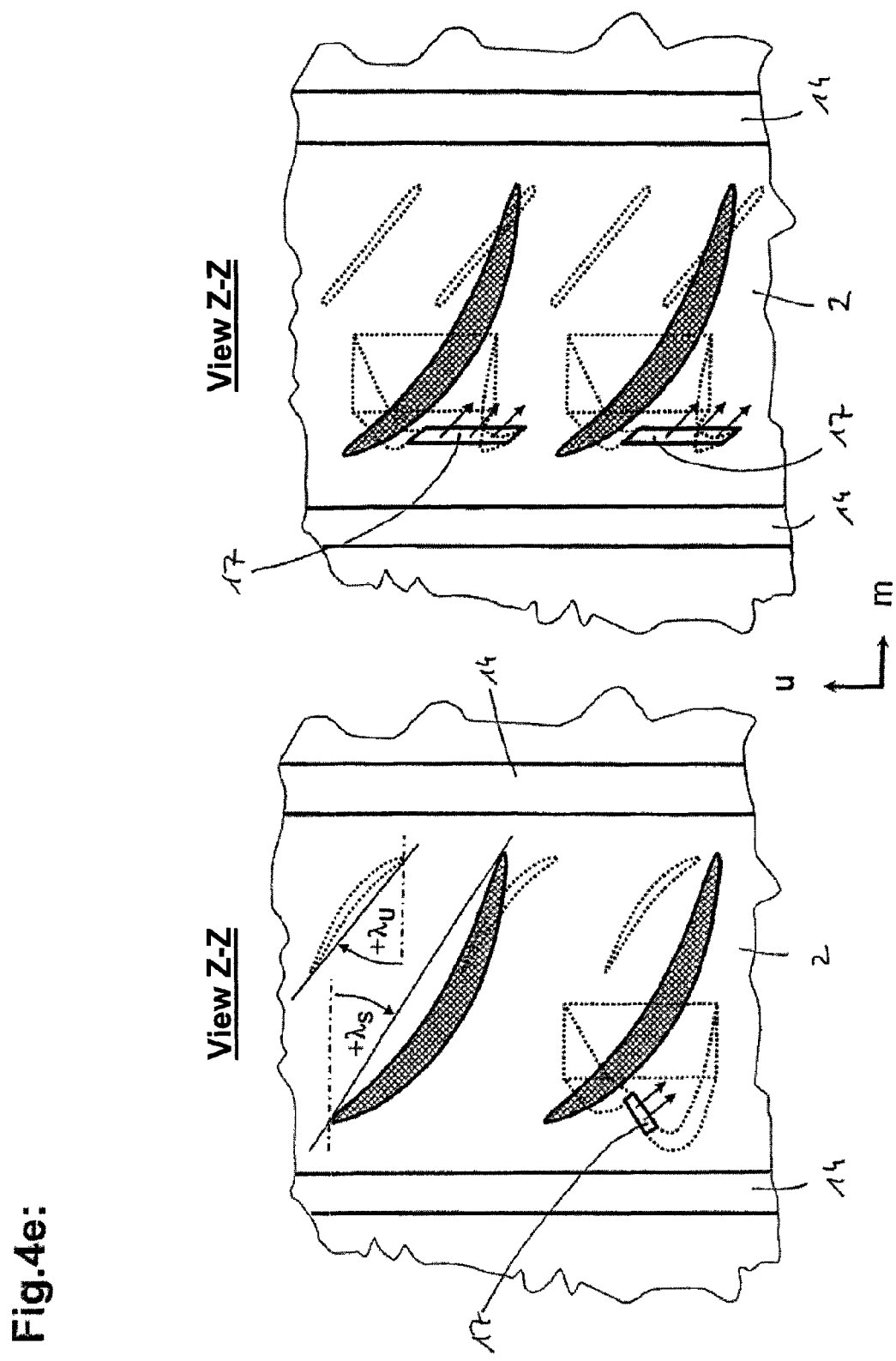
Figure 5B:
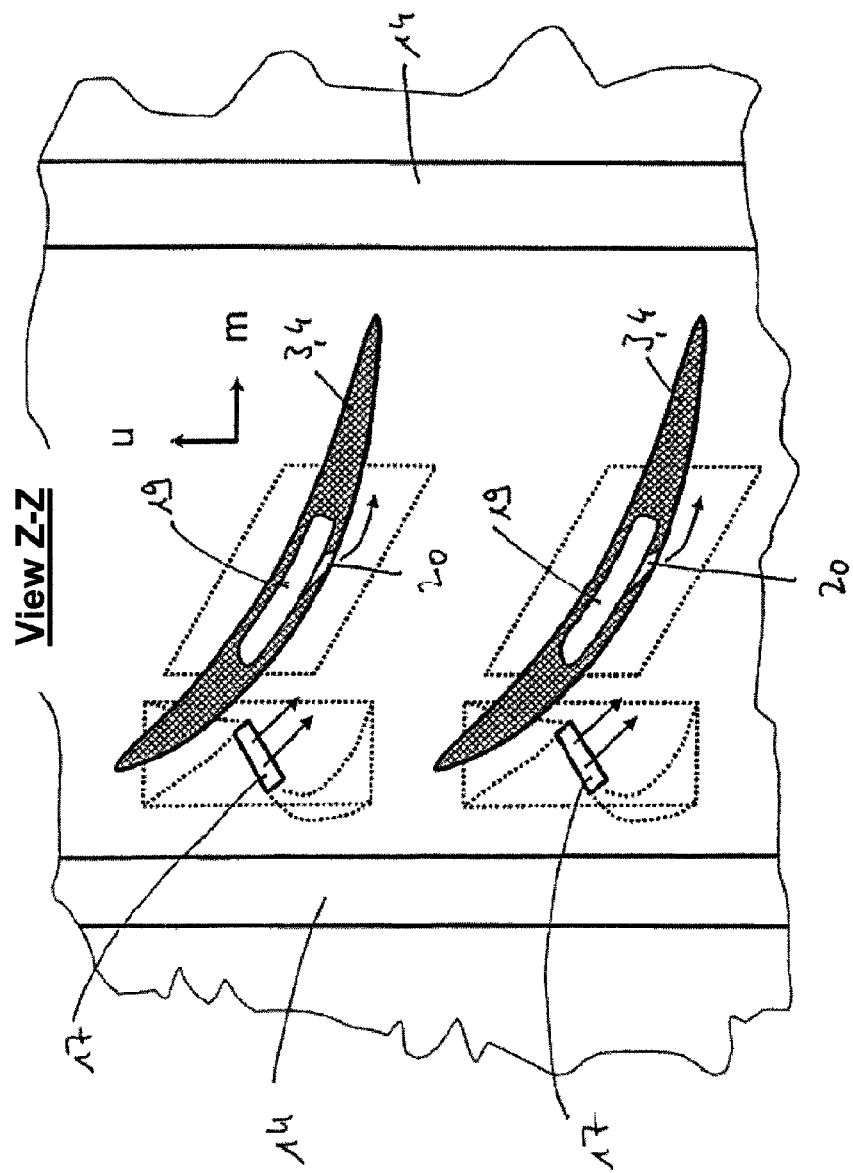
Figure 5C:
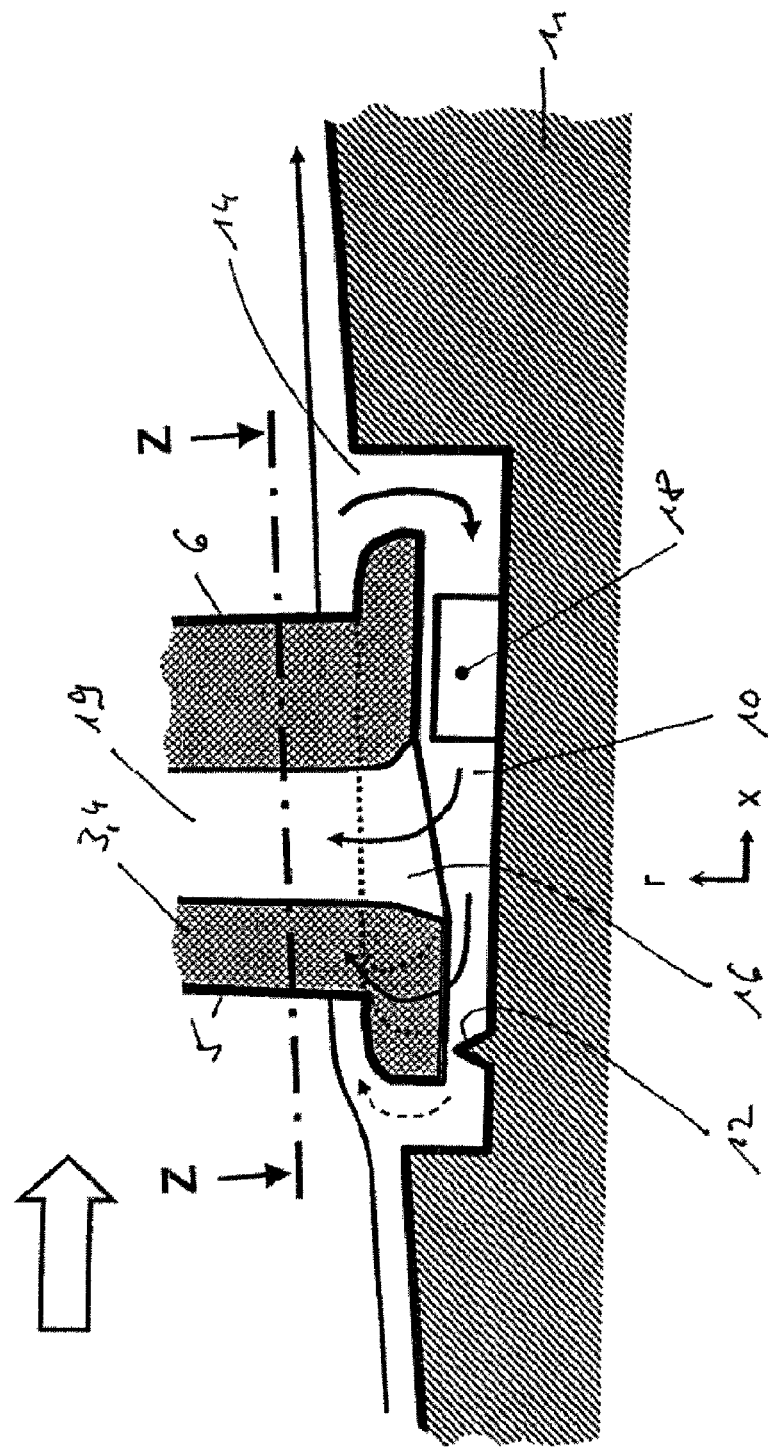
Figure 6A:
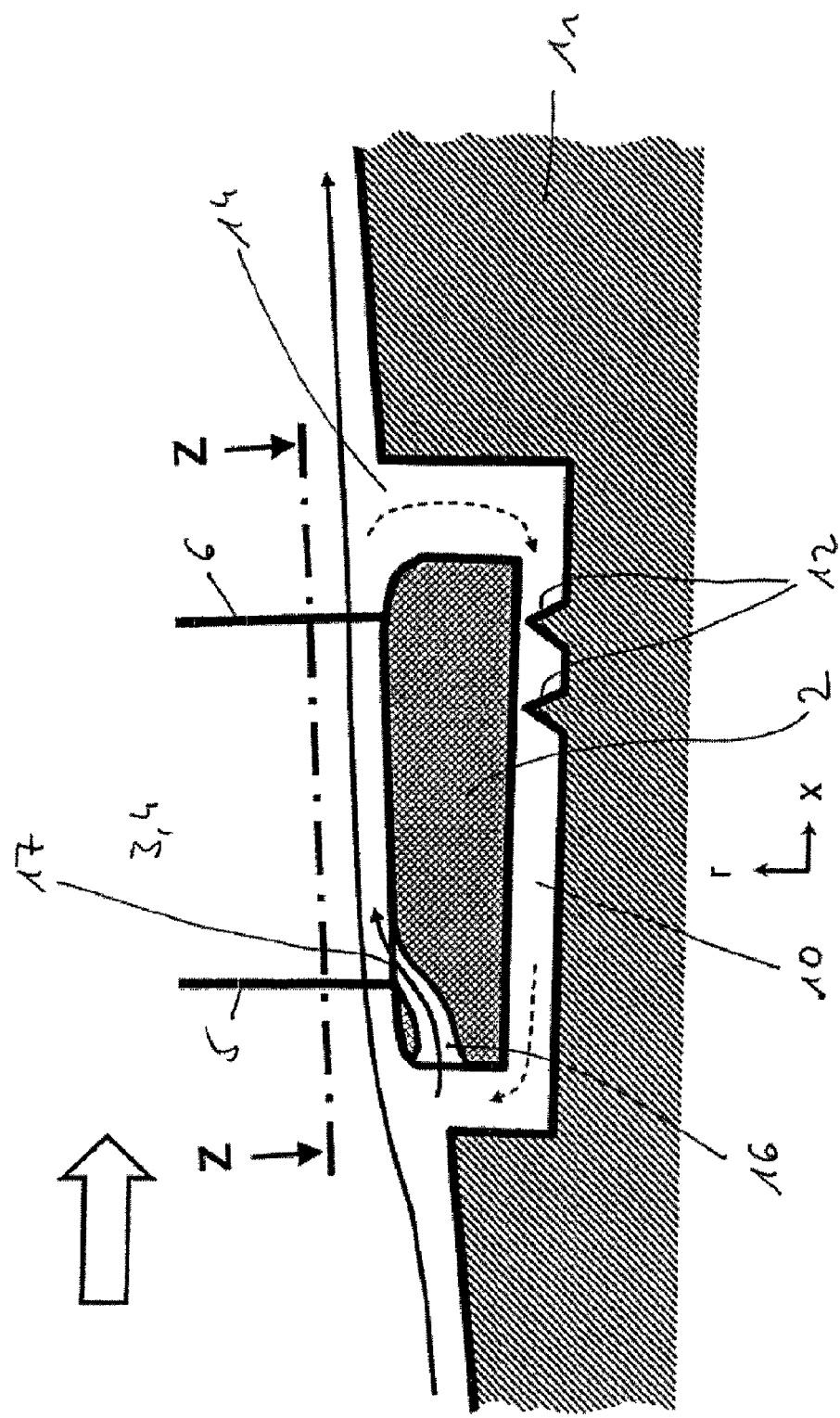

The present invention is more fully described in light of the accompanying figures showing preferred embodiments:

FIG. 1a (Prior Art) shows a blade according to the state of the art, rotor,

FIG. 1b (Prior Art) shows a blade according to the state of the art, fixed stator with inner shroud, FIG. 1c (Prior Art) shows a blade according to the state of the art, fixed stator with outer shroud, FIG. 1d (Prior Art) shows a blade according to the state of the art, variable stator, FIG. 1e (Prior Art) shows a blade shroud configuration, state of the art, with relative movement between blade shroud and surrounding physical structure, FIG. 1f (Prior Art) shows a blade shroud configuration, state of the art, with attachment at the surrounding component, FIG. 2 shows possible configurations of fluid flow machines relevant to the present invention, FIG. 3a shows a blade shroud with aperture in accordance with the present invention, rectangle-style configuration, with relative movement, meridional view, FIG. 3b shows blade shrouds with aperture in accordance with the present invention, rectangle-style configurations, with relative movement, meridional view, FIG. 3c shows an inflow zone at the main flow path in accordance with the present invention, view Z-Z, FIG. 3d shows a blade shroud with aperture in accordance with the present invention, flat configuration, with relative movement, view Z-Z, FIG. 3e shows a blade shroud with aperture in accordance with the present invention, flat configuration, with attachment at the surrounding physical structure, meridional view, FIG. 3f shows a blade shroud with aperture in accordance with the present invention, flat configuration, with attachment at the surrounding physical structure, view, Z-Z, FIG. 4a shows a blade shroud with aperture in accordance with the present invention, staged configuration, with relative movement, meridional view, FIG. 4b shows a blade shroud with aperture in accordance with the present invention, staged configuration, with relative movement, axial deflector/impeller, meridional view, FIG. 4c shows a blade shroud with aperture in accordance with the present invention, staged configuration, with relative movement, curved deflector/impeller, meridional view, FIG. 4d shows a blade shroud with aperture in accordance with the present invention, staged configuration, with relative movement, deflector/impeller as separate component, meridional view, FIG. 4e shows a blade shroud with aperture in accordance with the present invention, staged configuration, with relative movement, deflector/impeller, view Z-Z, FIG. 5a shows a blade shroud in accordance with the present invention with aperture to the main flow path and to the hollow blade, with relative movement, meridional view, FIG. 5b shows a blade shroud in accordance with the present invention with aperture to the main flow path and to the hollow blade, with relative movement, view Z-Z, FIG. 5c shows a blade shroud in accordance with the present invention with aperture to the main flow path and to the hollow blade, with relative movement, deflector/impeller, meridional view, FIG. 6a shows a blade shroud in accordance with the present invention with aperture on the inflow side, with relative movement, meridional view, FIG. 6b shows a blade shroud in accordance with the present invention, with aperture on the inflow side, with relative movement, view Z-Z.

In the present invention, the shroud of a blade row is basically characterized in that, when viewing in the meridional flow direction of the fluid flow machine, there is no contact with a shroud-surrounding component on the entire circumference at least in the trailing-edge area of the meridional extension of the blade along the main flow path boundary. The circumferential cavity so provided around the shroud has, at least on the downstream confinement of the shroud, a connection to the main flow path in the form of an annular gap.

On a conventional shroud configuration according to the state of the art, in which the shroud and the physical structure surrounding the shroud perform a rotary movement relative to each other, connection between the cavity surrounding the blade shroud and the main flow path is made at exactly two locations arranged one behind the other in meridional flow direction, namely by way of an annular gap directly upstream of the shroud and an annular gap directly downstream of the shroud, see FIG. 1e.

On another possible type of a conventional shroud configuration according to the state of the art, in which the shroud and the physical structure surrounding the shroud are connected to each other, connection between the cavity surrounding the shroud and the main flow path is made at exactly one location in meridional flow direction, namely by way of an annular gap directly downstream of the shroud, see FIG. 1f.

The solution according to the present invention is intended to use the annular cavity around the shroud as source of additional local fluid supply to the boundary and/or blade surfaces of the respective blade row.

Shroud configurations in accordance with the present invention are shown in FIGS. 3a to 6b. Crucial for the present invention is the conceptual arrangement of the shroud with a secondary flow path beginning at the shroud cavity and fully penetrating the shroud in its further course. The precise layout of the shroud cross-section and the precise geometry of the confinements of the shroud cavity are, in accordance with the present invention, adaptable to the respective conditions. For clarity, the said invention-irrelevant features have been outlined in simplified form only to the extent necessary for the representation and the comprehension of the context of the present invention.

FIGS. 3a to 3e show examples of some shroud configurations 2 with aperture 16 according to the present invention. The representation is limited to the area in the vicinity of the main flow path boundary. The arrangement includes a blade row 3, 4 whose outer end extends up to the main flow path boundary which is here formed by the shroud 2 connected to the blades 3, 4 of the blade row. The shroud 2 is surrounded by a physical structure 11 such that a cavity 10 connecting to the main flow path is formed around the shroud 2 in at least part of the extension of the latter. Upstream and/or downstream of the blade row 3, 4 with shroud 2, further blade rows can be arranged which, for simplicity, have here been omitted from the illustration. The shroud 2 commences in the vicinity and upstream of the blade leading edge 5 and terminates in the vicinity and downstream of the blade trailing edge 6.

FIG. 3a shows an arrangement of a blade row with shroud 2 according to the present invention in the meridional plane set up by the axial direction x and the radial direction r. The shroud 2 is here provided as flat, non-staged annular body with essentially rectangle-style cross-section relative to which the surrounding physical structure 11 performs a rotary movement. Leakage sealing is here provided by way of example of a sealing fin 12 originating at the surrounding physical structure 11 and leaving a minimum running gap to the shroud 2 or, in operation of the fluid flow machine, temporarily also contacting the side of the shroud 2 facing away from the main flow path, if applicable with an abradable coating here not illustrated. In accordance with the present invention, a secondary flow path is provided by aperture 16 which penetrates the shroud 2 and, when viewed in the main flow direction (bold arrow from the left to the right-hand side), is situated downstream of the sealing fin 12. Thus, without affecting sealing efficiency, fluid is enabled to enter the shroud cavity 10 downstream of the shroud 2 and issue via the secondary flow path/aperture 16, which is here provided as nozzle-type, curved aperture 16, to the main flow path-facing side of the shroud 2 (outlet opening 17) to energize the boundary flow there. In FIGS. 3c and 3d, the marked view Z-Z shows further features of the present invention.

FIG. 3b shows, in meridional view, further variants of blade shroud configurations with aperture 16 as provided by the present invention.

Figure part 3b.A shows a variant with fixed connection between blade row 3, 4 and shroud 2 in which the secondary flow path 16 is provided in a flat shroud 2 and has the form of a nozzle-type, curved, short aperture 16. The aperture 16 commences on the side of the shroud 2 which faces away from the main flow path and terminates on the main flow path-facing side of the shroud 2 with an opening 17 protruding into the main flow.

Figure part 3b.B shows a variant with fixed connection between blade row 3, 4 and shroud 2 in which the secondary flow path 16 is provided in a deep shroud 2 and has the form of a nozzle-type, curved, long aperture 16. The aperture 16 commences on the outflow side of the shroud 2 and terminates with a contour-conformal opening 17 on the main flow path-facing side of the shroud 2.

Figure part 3b.C shows a variant with variable blades 3, 4 rotatable within the shroud 2, in which the secondary flow path 16 is provided in a deep shroud 2 and has the form of a nozzle-type, curved, long aperture 16. The aperture 16 commences on the side of the shroud 2 which faces away from the main flow path and terminates with a counter-conformal opening 17 on the main flow path-facing side of the shroud 2.

Figure part 3b.D shows a variant with fixed connection between blade row 3, 4 and shroud 2 in which the secondary flow path 16 is provided in a deep and tailored shroud 2 and has the form of a nozzle-type, curved, long aperture 16. The aperture 16 commences on the outflow side of the shroud 2 and terminates with a contour-conformal opening 17 on the main flow path-facing side of the shroud 2.

FIG. 3c shows the area of a blade end in view Z-Z, i.e. the blade passage in the plane set up by the circumferential direction u and the meridional direction m. Shown are two fluid supply zones in which supply from the secondary flow path 16 to the main flow path-facing side of the shroud 2 is provided in accordance with the present invention.

Both zones are essentially supported on the profile suction side: an extensive supply zone IA1 in which supply is advantageous and a further restricted supply zone IA2 which is situated within IA1 and in which supply is particularly favorable.

The extensive supply zone IA1 is limited by:
a.) a rectilinear connection between the leading edge point L1 and the point A located 0.3 $C_M$ upstream of L1 in the meridional direction; $C_M$ designates the meridional length of the blade profile on the sidewall,
b.) a rectilinear connection between the point A and the point B, which is 0.3 $C_M$ upstream of the leading edge point L2 in the meridional direction
c.) a rectilinear connection between point B and the leading edge point L2,
d.) a rectilinear connection between the leading edge point L1 and the point C located in the trailing edge plane at a distance of 0.6 $S_O$ from the opposite profile suction side. $S_O$ designates the distance between two adjacent blade trailing edges at the boundary of the main flow path,
e.) a rectilinear connection between point C and the trailing edge point T,
f.) the profile suction side SS given between L2 and T.

The restricted supply zone IA2 is limited by:
a.) a rectilinear connection between the leading edge point L2 and the point B located 0.3 $C_M$ upstream of L2 in the meridional direction; $C_M$ designates the meridional length of the blade profile on the sidewall,
b.) a rectilinear connection between the point B and the point D located at the same meridional coordinate and 0.6 $S_O$ remote from the point B in the circumferential direction. $S_O$ designates the distance between two adjacent blade trailing edges at the boundary of the main flow path,
c.) a rectilinear connection between the point D and the point E located 0.7 $C_M$ downstream of the leading edge plane and, relative to the trailing edge point T, being offset to the adjacent profile pressure side by 0.4 $S_O$ in the circumferential direction,
d.) a rectilinear connection between point E and the profile suction side in the circumferential direction,
e.) a portion of the profile suction side in the area between the leading edge plane and a plane located 0.7 $C_M$ downstream of the leading edge plane in the meridional direction.

FIG. 3d shows the view Z-Z marked in FIG. 3a. Shown is a blade row 3, 4 which is here represented by two adjacent blade profiles. The view is here from the inner of the main flow approximately vertically to the meridional direction m and the circumferential direction u onto the shroud 2. Upstream and downstream of the shroud 2, the annular gaps 14 are shown by which the connection between the main flow path and the shroud cavity is made. In addition, one supply opening 17 through which fluid issues from the shroud 2 is provided in each passage between two blades 3, 4. A possible form of the aperture 16 according to the present invention is shown by dotted lines. The present invention also provides for the provision of several apertures or supply openings, respectively, per blade passage or for the provision of apertures or supply openings, respectively, only in selected blade passages. The left-hand part of the Figure exemplifies an arrangement with short supply openings 17 inclined to the meridional direction m, the right-hand part of the Figure shows an arrangement with long supply openings 17 oriented vertically to the meridional direction m.

FIG. 3e shows an arrangement of a blade row 3, 4 with shroud 2 according to the present invention in the meridional plane set up by the axial direction x and the radial direction r. The shroud 2 is here provided as flat, non-staged annular body with essentially rectangle-style cross-section, which is connected to the surrounding physical structure 11.

Connection between shroud 2 and the surrounding physical structure 11 may, as shown here, be provided by two adjacent components, for example by a blade root-type form. However, the present invention also provides for configurations formed by a single-piece body. According to the present invention, a secondary flow path 16 is provided in the shroud 2 which penetrates the shroud 2 and, when viewed in the main flow direction (bold arrow from the left to the right-hand side), is located downstream of the connection with the surrounding physical structure. Thus, fluid is enabled to enter the shroud cavity 10 downstream of the shroud 2 and issue via the secondary flow path, which is here provided as nozzle-type, curved aperture 16, onto the main flow path-facing side of the shroud 2 to energize the boundary flow there.

In particular, the inventive solution of a shroud 2 with aperture 16 here illustrated can be provided where additionally an outlet duct for the discharge of fluid out of the main flow path of the fluid flow machine exists downstream of the respective blade row 3, 4 (shown dotted in the Figure). Also marked is view Z-Z which in FIG. 3f shows in the known manner a possible arrangement of supply openings and apertures according to the present invention.

FIG. 4a shows, in the meridional plane, a further arrangement of a blade row 3, 4 with shroud 2 according to the present invention. Here, the usual rectangle-style cross-section of the shroud 2 is, according to the present invention, replaced by a particularly favorable cross-section staged in the main flow direction permitting fluid to be supplied from the shroud outflow side to the aperture 16 in the shroud 2. This enables the inflow of the aperture 16 to take place in an enlarged cavity cross-section and with correspondingly lower loss. Furthermore, this solution according to the present invention enables the aperture 16 itself to be shortened and designed aerodynamically more favorably, namely as a short, curved duct situated close to the supply point. The shroud 2 and the surrounding physical structure 11 perform a rotary movement relative to each other. For leakage sealing, a dual sealing fin 12 is here provided. The arrangement shown in the marked view Z-Z is similar to the representation in FIG. 3d.

FIG. 4b shows, in the meridional plane, an arrangement of a blade row 3, 4 with shroud 2 supplemented according to the present invention by further elements. The shroud 2 here again has the cross-section staged in the main flow direction according to the present invention, with aperture entry 14 on the shroud outflow side. The shroud 2 and the surrounding physical structure 11 perform a rotary movement relative to each other, and a deflector 18 deflecting the fluid flowing to the aperture 16 is provided on the surrounding physical structure. If the surrounding physical structure 11 is of the rotary type and the shroud 2 of the stationary type, the deflector 18, according to the present invention, has the function of an impeller 18 delivering fluid to the aperture 16. However, in accordance with the present invention, the deflector 18 can also be provided on the shroud 2 to directionally correct the inflow of the aperture 16. Also falling within the scope of the present invention, the aperture 16 itself can be provided with struts, flow dividers or deflecting aids.

FIG. 4c shows in a modified form of FIG. 4b a solution of a shroud 2 with aperture 16 and deflectors 18 in accordance with the present invention. The shroud 2 here again has the cross-section staged in the main flow direction, with aperture entry 14 on the shroud outflow side. The shroud 2 and the surrounding physical structure 11 perform a rotary movement relative to each other. The contour of the surrounding physical structure 11 in the area of the deflector 18 and the deflector 18 itself are, in accordance with the present invention, provided such that the flow duct formed has an inclination/curvature towards the shroud 2 when viewed in the direction of the flow in the shroud cavity. Thus, the inflow of the aperture 16 is given a directional component towards the shroud 2. In combination with the previous features according to the present invention, the shroud 2 here protrudes significantly into the main flow path to reduce, by way of a stagnation effect on the inflow side of the shroud 2, the amount of leakage flow entering the main flow path.

FIG. 4d shows in a modified form of FIG. 4c a solution of a shroud 2 with aperture 16 and deflector 18 in accordance with the present invention. Here, the deflector 18 is provided as separate annular component connected to the surrounding physical structure 11.

FIG. 4e shows the view Z-Z marked in FIGS. 4c and 4d. Evident are the profiles of the blade row 3, 4 in the main flow path and the shroud apertures 17 which terminate at supply openings on the main flow path. In the solution according to the present invention here shown, the deflector 18 is provided by a number of curved or non-curved flow profiles or simple webs. If the deflector 18 is attached to the physical structure 11 surrounding the shroud 2, it is provided by the present invention that the stagger angle $\lambda_S$ of the blades in the main flow path and the stagger angle $\lambda_U$ of the deflectors 18 in the shroud cavity have equal signs as defined in FIG. 4e.

FIG. 5a shows another arrangement of a blade shroud 2 with aperture 16 in the meridional plane in accordance with the present invention. The shroud 2, on the side facing away from the main flow path, is provided with a step at which two different apertures 16 according to the present invention commence. Firstly, the shroud 2 is penetrated by a secondary flow path 16 which, as already described in the above, terminates on the main flow-facing side of the shroud 2 (aperture type 1) and, secondly, a further secondary flow path 16 extends through the shroud 2 into the interior of at least one blade 3, 4 connected to the shroud 2 (aperture type 2). The blades 3, 4, which receive fluid through the type 2 shroud aperture 16, have one or several cavities 19 from which the fluid is finally issued through one or several openings 20 onto the main flow-wetted blade surface, thereby being supplied to the main flow. Details of fluid guidance upon passing the aperture are known from the state of the art. Of course, shroud arrangements which provide solely for one or several type 2 apertures also fall within the scope of the present invention. Also falling within the scope of the present invention is a type 2 aperture having webs, flow dividers and deflection aids. Also marked in the Figure is view Z-Z which in FIG. 5b shows in the known manner the arrangement of supply openings and apertures according to the present invention.

FIG. 5b exemplifies an arrangement with one each cavity 19 per blade 3, 4 into which fluid from the shroud cavity 10 flows via the aperture 16 (type 2). In the example here shown, the fluid issues onto the convex suction side of the blade 3, 4 and mixes with the main flow. Simultaneously, fluid is supplied in the environment of the blades 3, 4 to the main flow path via another aperture (type 1) on the shroud surface.

FIG. 5c again shows a shroud arrangement with a combination of type 1 and type 2 apertures. Provided on the surrounding physical structure 11 is a deflector 18 which deflects the fluid flowing to the apertures. If the surrounding physical structure 11 is of the rotary type and the shroud 2 of the stationary type, the deflector 18, in accordance with the present invention, has the function of an impeller delivering fluid to the apertures. However, according to the present invention, the deflector 18 can also be provided on the shroud 2 to directionally correct the inflow of the aperture. Also falling within the scope of the present invention, the aperture itself can be provided with struts, flow dividers or deflecting aids.

FIG. 6a shows, in the meridional plane, a further concept according to the present invention for the arrangement of a blade shroud 2 with aperture 16. The aperture 16 commences on the inflow side of the shroud 2 and terminates on the side facing the main flow. Accordingly, it is a type 1 aperture. It is particularly favorable for this inventive shroud 2 with aperture if, as shown here, the shroud 2 protrudes into the main flow path by a significant amount. Also marked in the Figure is view Z-Z which in FIG. 6b shows the arrangement of supply openings and apertures according to the present invention.

The present invention can be described as follows:

A fluid flow machine with a main flow path in which at least one row of blades is arranged, and with a blade shroud which forms a confinement of the main flow path in the area of a blade row and is embedded in a recess of a surrounding physical structure, with the space (cavity) so formed between the shroud and the surrounding physical structure being provided with an annular connection to the main flow path at least on the outflow side of the shroud, and with the blade shroud being penetrated by at least one secondary flow path which, commencing at a location of high pressure on the shroud, leads to a surface wetted by the main flow, with the blade row, in the area of which the blade shroud is arranged, having blades which are fixedly connected to the shroud, with the blade row, in the area of which the blade shroud is arranged, having blades which are rotatably connected to the shroud around an axis, with at least one secondary flow path penetrating the blade shroud issuing at a surface confining the main flow path of the fluid flow machine on hub or casing, with a secondary flow path penetrating the blade shroud forming an aperture whose exit opening is disposed in the supply zone IA1, which is limited as follows:

a.) a rectilinear connection between the leading edge point L1 and the point A located 0.3 $C_M$ upstream of L1 in the meridional direction; $C_M$ designates the meridional length of the blade profile on the sidewall, b.) a rectilinear connection between the point A and the point B, which is 0.3 $C_M$ upstream of the leading edge point L2 in the meridional direction c.) a rectilinear connection between point B and the leading edge point L2, d.) a rectilinear connection between the leading edge point L1 and the point C located in the trailing edge plane at a distance of 0.6 $S_O$ from the opposite profile suction side. $S_O$ designates the distance between two adjacent blade trailing edges at the boundary of the main flow path, e.) a rectilinear connection between point C and the trailing edge point T, and f.) the profile suction side SS given between L2 and T, with at least one flow path penetrating the blade shroud forming an aperture whose exit opening is disposed in the restricted supply zone IA2, which is limited as follows:

a.) a rectilinear connection between the leading edge point L2 and the point B located 0.3 $C_M$ upstream of L2 in the meridional direction; $C_M$ designates the meridional length of the blade profile on the sidewall, b.) a rectilinear connection between the point B and the point D located at the same meridional coordinate and 0.6 $S_O$ remote from the point B in the circumferential direction. $S_O$ designates the distance between two adjacent blade trailing edges at the boundary of the main flow path, c.) a rectilinear connection between the point D and the point E located 0.7 $C_M$ downstream of the leading edge plane and, relative to the trailing edge point T, being offset to the adjacent profile pressure side by 0.4 $S_O$ in the circumferential direction, d.) a rectilinear connection between point E and the profile suction side in the circumferential direction, and e.) a portion of the profile suction side in the area between the leading edge plane and a plane located 0.7 $C_M$ downstream of the leading edge plane in the meridional direction, with at least one secondary flow path (aperture) penetrating the blade shroud leading into the interior of at least one blade of the blade row connected to the shroud, with the blade in turn being provided with at least one opening in the blade profile surface through which fluid can issue into the main flow path, with the secondary flow path (aperture) in the area of its exit opening having the form of a nozzle which is designed such that the exiting fluid jet is essentially tangentially directed to the confinement of the main flow path, with the aperture exit opening (supply opening) protruding into the main flow path, with the blade shroud having, on the side facing away from the main flow at least one step, with inflow of the fluid into the aperture being provided at least partially opposite to the main flow direction, with a.) the blade shroud and the surrounding physical structure performing a rotary movement relative to each other, and a cavity being provided around the shroud which has annular openings to the main flow path, one directly on the upstream and another one directly on the downstream side of the shroud, and b.) a leakage sealing mechanism being provided in the area of the cavity, with deflectors for deflecting the secondary fluid flow being provided in the area of the cavity, with the deflectors providing that the shroud cavity is flown essentially opposite to the main flow, and, when viewed in the main flow direction, the leakage sealing mechanism being arranged on the upstream side of the deflectors, with the deflectors for deflecting the secondary fluid flow being provided as at least one row of blade-type bodies, with a deflector for deflecting the secondary fluid flow being connected to the physical structure surrounding the shroud, and blade-type profiles provided as deflectors and the profiles of the blades in the main flow path connected to the shroud having equally signed stagger angles, with a.) said shrouded blade row being a stator row, b.) the physical structure surrounding the shroud being a rotor drum, and c.) the deflecting deflectors being connected to the rotor drum, thereby providing a secondary impeller.

List of Reference Numerals

1 Casing (non-rotating)
2 Blade shroud/shroud
3 Rotor/rotor blade row
4 Stator/stator vane row
5 Blade leading edge (VK)
6 Blade trailing edge (HK)
7 Machine axis
8 Hub (rotating)
9 Stator blade root/blade root
10 Cavity/shroud cavity
11 Physical structure with rotating relative movement
12 Sealing/sealing mechanism/sealing fin
13 Chamber
14 Annular gap/aperture entry
15 Annulus
16 Aperture/secondary flow path
17 Outlet opening/opening/supply opening/aperture exit opening
18 Deflector/impeller
19 Cavity
20 Opening

What is claimed is:

1. A fluid flow machine, comprising:
a main flow path;
at least one row of blades positioned in the main flow path,
a blade shroud which forms a confinement of the main flow path in an area of a blade row and is positioned in a recessed cavity of a surrounding physical structure, with the cavity formed between the shroud and the surrounding physical structure and the cavity including an annular connection to the main flow path on at least a downstream side of the blade shroud, and
at least one secondary flow path passing from the cavity through the blade shroud and including an exit opening, and the secondary flow path commencing at a location of high pressure on the shroud, and ending at a surface wetted by the main flow.

2. The fluid flow machine of claim 1, wherein blades of the blade row are fixedly connected to the shroud.

3. The fluid flow machine of claim 1, wherein blades of the blade row are rotatably connected to the blade shroud around an axis.

4. The fluid flow machine of claim 1, wherein the at least one secondary flow path penetrating the blade shroud issues on at least one of a hub and a casing.

5. The fluid flow machine of claim 4, wherein the exit opening is positioned within a supply zone IA1, which is limited as follows:

a.) a rectilinear connection between a leading edge point L1 and the point A located 0.3 $C_M$ upstream of L1 in the meridional direction; $C_M$ designates the meridional length of the blade profile on the sidewall, b.) a rectilinear connection between a point A and a point B, which is 0.3 $C_M$ upstream of a leading edge point L2 in the meridional direction, c.) a rectilinear connection between a point B and the leading edge point L2, d.) a rectilinear connection between the leading edge point L1 and a point C located in the trailing edge plane at a distance of 0.6 $S_O$ from the opposite profile suction side, $S_O$ designates the distance between two adjacent blade trailing edges at the boundary of the main flow path, e.) a rectilinear connection between the point C and a trailing edge point T, and f.) a profile suction side SS given between points L2 and T.

6. The fluid flow machine of claim 4, wherein the exit opening is positioned within a restricted supply zone IA2, which is limited as follows:

a.) a rectilinear connection between a leading edge point L2 and a point B located 0.3 $C_M$ upstream of L2 in the meridional direction; $C_M$ designates the meridional length of the blade profile on the sidewall, b.) a rectilinear connection between a point B and a point D located at the same meridional coordinate and 0.6 $S_O$ remote from the point B in the circumferential direction, $S_O$ designates the distance between two adjacent blade trailing edges at the boundary of the main flow path, c.) a rectilinear connection between a point D and a point E located 0.7 $C_M$ downstream of the leading edge plane and, relative to a trailing edge point T, being offset to the adjacent profile pressure side by 0.4 $S_O$ in the circumferential direction, d.) a rectilinear connection between point E and the profile suction side in the circumferential direction, and e.) a portion of the profile suction side in the area between the leading edge plane and a plane located 0.7 $C_M$ downstream of the leading edge plane in the meridional direction.

7. The fluid flow machine of claim 1, wherein the at least one secondary flow path leads into an interior of at least one blade of the blade row connected to the shroud, and the exit opening is positioned in a blade profile surface through which fluid issues into the main flow path.

8. The fluid flow machine of claim 1, wherein the secondary flow path in an area of the exit opening is formed as a nozzle which directs the exiting fluid jet essentially tangentially to the confinement of the main flow path.

9. The fluid flow machine of claim 1, wherein exit opening protrudes into the main flow path.

10. The fluid flow machine of claim 1, wherein the blade shroud includes, on a side facing away from the main flow, at least one step, with inflow of the fluid into the secondary flow path being provided at least partially opposite to the main flow direction.

11. The fluid flow machine of claim 1, wherein the blade shroud and the surrounding physical structure perform a rotary movement relative to each other, and the cavity is provided around the shroud includes annular openings to the main flow path, one directly on an upstream and another one directly on a downstream side of the shroud, and that a leakage sealing mechanism is positioned in the cavity.

12. The fluid flow machine of claim 11, and further comprising a plurality of deflectors positioned within the cavity for deflecting the secondary fluid flow.

13. The fluid flow machine of claim 12, wherein the deflectors provide that the cavity is flown essentially opposite to the main flow, and, when viewed in the main flow direction, the leakage sealing mechanism is positioned arranged on the upstream side of the deflectors.

14. The fluid flow machine of claim 12, wherein the deflectors are configured as at least one row of blade-type bodies.

15. The fluid flow machine of claim 11, and further comprising a deflector having a blade-type profile connected to the physical structure surrounding the shroud for deflecting the secondary fluid flow, the blade-type profile of the deflector and profile of the blades in the main flow path connected to the shroud have equally signed stagger angles.

16. The fluid flow machine of claim 12, wherein the blade row with shroud is a stator row, that the physical structure surrounding the shroud is a rotor drum, and that the deflectors are connected to the rotor drum and thereby act as secondary impellers.

* * * * *